(12) United States Patent
Koh et al.

(10) Patent No.: US 12,515,168 B2
(45) Date of Patent: Jan. 6, 2026

(54) DEVICE FOR REDUCING POLLUTANTS IN INDOOR AIR, AMBIENT AIR, OR EXHAUST GAS BY USING NONTHERMAL PLASMA

(71) Applicants: THE PRIME SOLUTION L.L.C., Seoul (KR); Won Tae Koh, Seoul (KR)

(72) Inventors: Won Tae Koh, Seoul (KR); Jeong Hwan Koh, Seoul (KR); Chang Soo Son, Seoul (KR)

(73) Assignees: THE PRIME SOLUTION L.L.C., Seoul (KR); Won Tae Koh, Seoul (KR)

( * ) Notice: Subject to any disclaimer, the term of this patent is extended or adjusted under 35 U.S.C. 154(b) by 497 days.

(21) Appl. No.: 18/010,692

(22) PCT Filed: Jul. 29, 2020

(86) PCT No.: PCT/KR2020/010028
§ 371 (c)(1),
(2) Date: Dec. 15, 2022

(87) PCT Pub. No.: WO2021/256608
PCT Pub. Date: Dec. 23, 2021

(65) Prior Publication Data
US 2023/0256386 A1 Aug. 17, 2023

(30) Foreign Application Priority Data
Jun. 16, 2020 (KR) .................. 10-2020-0072720

(51) Int. Cl.
*B01D 53/32* (2006.01)
(52) U.S. Cl.
CPC ........ *B01D 53/32* (2013.01); *B01D 2259/818* (2013.01)
(58) Field of Classification Search
CPC .... B03C 3/49; B03C 3/41; B03C 3/70; B03C 2201/10; B03C 2201/30; B03C 2201/08;
(Continued)

(56) References Cited

U.S. PATENT DOCUMENTS 1,931,436 A * 10/1933 Deutsch ................ B03C 3/36
313/325
2,926,749 A * 3/1960 Oswald ................ B03C 3/49
96/98
(Continued)

FOREIGN PATENT DOCUMENTS

HU 0083845 A1 * 7/1983 ............ B03C 3/017
KR 10-2006-0088990 A 8/2006
(Continued)

OTHER PUBLICATIONS

International Search Report from corresponding PCT Application No. PCT/KR2020/010028, dated Mar. 12, 2021.

*Primary Examiner* — Jennifer Dieterle
*Assistant Examiner* — Sonji Turner
(74) *Attorney, Agent, or Firm* — Harness, Dickey & Pierce, P.L.C.

(57) ABSTRACT

Disclosed is a device including a chamber configured as a tubular body, the chamber being connected to a ground power source; a power supply device disposed outside the chamber and configured to continuously apply voltage having a magnitude set as direct current or alternating current; an emitter configured as a hollow tubular body having a plurality of cusps formed on an outer surface thereof and configured to generate plasma, the emitter being disposed in the chamber, elongated in a direction parallel to a flow direction of the processing target gas, electrically connected to the power supply device, and configured to generate nonthermal plasma; a rod configured to electrically connect the emitter and the power supply device and support the emitter; and an insulator configured to electrically insulate the rod and the chamber and prevent arcing from occurring between the rod and the chamber.

15 Claims, 37 Drawing Sheets

(58) Field of Classification Search
CPC .............. B01D 53/32; B01D 2259/818; B01D 2259/708; H05H 1/471; H05H 2245/15; H05H 2245/17; Y02A 50/20
See application file for complete search history.

(56) References Cited

U.S. PATENT DOCUMENTS

| | | | | |
|---|---|---|---|---|
| 3,315,444 | A * | 4/1967 | De Seversky | B03C 3/36 55/318 |
| 3,447,049 | A * | 5/1969 | Morfopoulos | B05C 19/002 361/226 |
| 3,653,185 | A * | 4/1972 | Scott | B03C 3/383 422/906 |
| 4,266,948 | A * | 5/1981 | Teague | B03C 3/12 96/57 |
| 5,126,638 | A * | 6/1992 | Dethlefsen | H01T 2/02 327/365 |
| 5,263,317 | A * | 11/1993 | Watanabe | B03C 3/74 60/275 |
| 6,471,746 | B2 * | 10/2002 | Hagglund | B03C 3/12 95/79 |
| 8,157,902 | B2 * | 4/2012 | Ogut | H05H 1/2406 60/275 |
| 11,078,818 | B2 * | 8/2021 | Son | F01N 3/027 |
| 2005/0028676 | A1 * | 2/2005 | Heckel | B03C 3/41 96/95 |
| 2007/0051237 | A1 * | 3/2007 | Furukawa | B03C 3/60 95/59 |
| 2007/0261556 | A1 * | 11/2007 | Kasai | F01N 3/021 96/74 |
| 2008/0035472 | A1 * | 2/2008 | Lepage | A61L 9/22 204/229.8 |
| 2017/0354976 | A1 * | 12/2017 | Loreth | B03C 3/12 |
| 2018/0029043 | A1 * | 2/2018 | Henriquez Prevoo | B03C 3/78 |
| 2019/0076852 | A1 * | 3/2019 | Luo | F24F 7/007 |
| 2019/0210038 | A1 * | 7/2019 | Kuroi | B03C 3/368 |
| 2020/0256229 | A1 * | 8/2020 | Son | F01N 3/027 |
| 2021/0213385 | A1 * | 7/2021 | Son | B01D 53/323 |
| 2022/0161188 | A1 * | 5/2022 | Son | F01N 9/00 |

FOREIGN PATENT DOCUMENTS

| | | |
|---|---|---|
| KR | 10-2011-0009659 A | 1/2011 |
| KR | 10-2014-0022624 A | 2/2014 |
| KR | 10-2014-0112270 A | 9/2014 |
| KR | 10-1934100 B1 | 3/2019 |
| KR | 10-2019-0094741 A | 8/2019 |
| KR | 10-2090873 B1 | 3/2020 |

* cited by examiner

FIG. 32
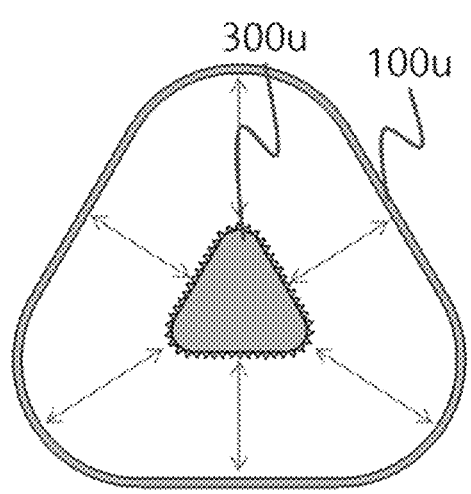
6100
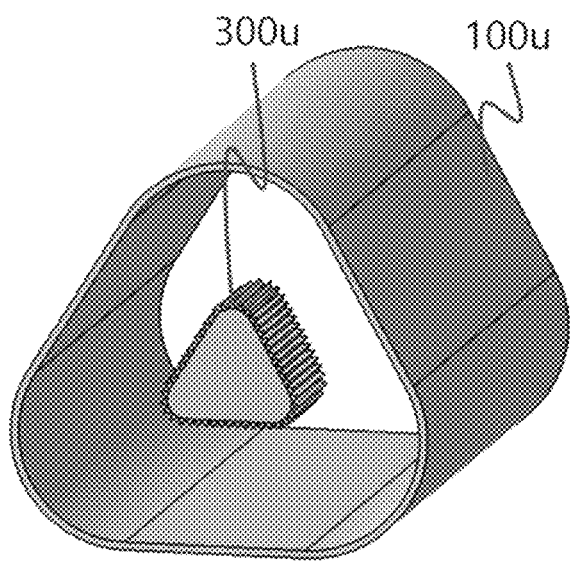
6200

DEVICE FOR REDUCING POLLUTANTS IN INDOOR AIR, AMBIENT AIR, OR EXHAUST GAS BY USING NONTHERMAL PLASMA

CROSS-REFERENCE TO RELATED APPLICATIONS

This application is a national phase application of PCT Application No. PCT/KR2020/010028, filed on Jul. 29, 2020, which claims priority to Korean Patent Application Nos. 10-2020-0072720, filed on Jun. 16, 2020. The entire disclosure of the applications identified in this paragraph is incorporated herein by reference.

TECHNICAL FIELD

The present disclosure relates to a device for reducing pollutants in indoor air, ambient air, or exhaust gas by using nonthermal plasma, and more particularly, to a device for reducing pollutants in indoor air, ambient air, or exhaust gas by using nonthermal plasma, which has an arcing prevention/control structure capable of improving efficiency in generating nonthermal plasma and reduces pollutants such as particulate matters or volatile organic compounds (VOCs) contained in air in factories or densely populated urban areas, indoor air or ambient air of buildings, factories, or agricultural and livestock facilities, exhaust gas discharged from power stations using fossil fuel such as LNG and coal, and gas discharged from internal combustion engines.

BACKGROUND

This section provides background information related to the present disclosure which is not necessarily prior art.

A general device for reducing pollutants by using nonthermal plasma includes a chamber and an emitter as main components. In this case, the pollutants mean pollutants in indoor air or ambient air or pollutants such as particulate matters in exhaust gas.

Ambient air, indoor air, or exhaust gas flows into the chamber, which is a tubular body, and the emitter is disposed inside the chamber.

When high voltage is applied to the emitter, electric discharge occurs between the chamber and the emitter, and electrons are discharged.

The electrons, which are discharged at high speed, collide with pollutants contained in ambient air, indoor air, or exhaust gas, and the pollutants, which collide with the electrons, are converted into plasma in which electrons, ions, and neutral particles are mixed.

The high voltage, which is applied to the emitter, needs to be applied to the emitter without leakage.

If the high voltage leaks, the voltage drops between the emitter and the chamber, which may cause a rapid decrease in efficiency in generating plasma.

In particular, if arcing occurs between the chamber and a rod, which serves to position and support the emitter in the chamber, in addition to the electric discharge occurring between the chamber and the emitter, the electric discharge at the emitter deteriorates, which causes a rapid decrease in efficiency in generating nonthermal plasma.

In addition, intense arcing may damage surfaces of the chamber and the rod.

For this reason, in addition to the problems with the chamber and the rod, there may occur a severer problem in which a degree of fatigue of a power supply device for generating high voltage is consistently increased and the power supply device cannot operate because of damage or breakdown.

In addition, if moisture vapor or pollutants in ambient air, indoor air, or exhaust gas are accumulated, to a predetermined degree or higher, on a surface of an insulator that surrounds an outer surface of the rod and prevents a leak of electric current, arcing, which is induced to a source of pollution and moisture vapor accumulated on the surface of the insulator, also occurs in addition to electric current that weakly flows along the source of pollution and the moisture vapor accumulated on the surface of the insulator and removes the source of pollution. This arcing also causes the same problem as the arcing between the rod and the chamber.

However, the arcing, which is induced to the surface of the insulator, has an effect of removing the source of pollution and the moisture vapor accumulated on the surface of the insulator regardless of whether the arcing requires a large or small amount of power consumption. The problem with the arcing is in that the amount of power consumed by the arcing causes a drop of voltage applied to the emitter. If the voltage applied to the emitter drops to a predetermined degree or higher, the efficiency in generating plasma deteriorates, which consequently causes deterioration in efficiency in removing the source of pollution in ambient air, indoor air, or exhaust gas.

Accordingly, there is a need for a structure and device that may prevent and control the arcing by using an appropriate method, i.e., prevent intense arcing, induce the arcing to low-current weak arcing by adjusting electric current required for arcing within a predetermined range, maintain the efficiency in generating plasma at a normal level by maintaining voltage to be applied to the emitter at a predetermined level or higher, and quickly remove the source of pollution and the moisture vapor on the surface of the insulator.

The predetermined level or higher of voltage is preferably 90% or more of particularly regulated voltage.

DISCLOSURE

Technical Problem

The present disclosure relates to a device for reducing pollutants in indoor air, ambient air, or exhaust gas by using nonthermal plasma.

The present disclosure relates to a device for reducing pollutants by using nonthermal plasma, which has an emitter structure that prevents deterioration in efficiency in generating nonthermal plasma by preventing high-power consumption intense arcing and inducing low-power consumption weak arcing.

The present disclosure relates to a device for reducing pollutants in indoor air, ambient air, or exhaust gas by using nonthermal plasma, which has a chamber structure that induces low-power consumption weak arcing and prevents deterioration in efficiency in generating nonthermal plasma caused by high-power consumption intense arcing.

The present disclosure relates to a device for reducing pollutants in indoor air, ambient air, or exhaust gas by using nonthermal plasma, which has a structure and device that induces low-power consumption weak arcing and prevents deterioration in efficiency in generating nonthermal plasma caused by high-power consumption intense arcing.

Technical Solution

This section provides a general summary of the disclosure and is not a comprehensive disclosure of its full scope or all of its features.

One aspect of the present invention provides a device for reducing pollutants in indoor air, ambient air, or exhaust gas by using nonthermal plasma, the device including: a chamber configured as a tubular body in which processing target gas configured as indoor air, ambient air, or exhaust gas including pollutants flows, the chamber being connected to a ground power source; a power supply device disposed outside the chamber and configured to continuously apply voltage having a magnitude set as direct current or alternating current; an emitter configured as a hollow tubular body having a plurality of cusps formed on an outer surface thereof and configured to generate plasma, the emitter being disposed in the chamber, elongated in a direction parallel to a flow direction of the processing target gas, electrically connected to the power supply device, and configured to generate nonthermal plasma; a rod configured to electrically connect the emitter and the power supply device and support the emitter so that the emitter is disposed at a center of an interior of the chamber; and an insulator configured to electrically insulate the rod and the chamber and prevent arcing from occurring between the rod and the chamber.

In the device for reducing pollutants in indoor air, ambient air, or exhaust gas by using nonthermal plasma according to one aspect of the present invention, a most desirable ratio between a surface area of the emitter and an area of the chamber inner surface corresponding to a length of the emitter may be 1:1.

In the device for reducing pollutants in indoor air, ambient air, or exhaust gas by using nonthermal plasma according to one aspect of the present invention, the cusp provided on the emitter may have at least one shape selected from: a first cusp shape having at least one shape selected from a conical shape, a hemispherical shape, an elliptical hemispherical shape, a cylindrical shape, a pyramidal shape, a truncated pyramidal shape, and a prismatic shape; a second cusp shape having a shape having a curved surface in which a part or the entirety of a lateral surface of the first cusp shape includes a circular or elliptical shape; and a third cusp shape having a shape in which screw threads, screw troughs, or serrated teeth are spirally formed from an upper end to a lower end of or a part of a lateral surface of each of the first and second cusps.

In the device for reducing pollutants in indoor air, ambient air, or exhaust gas by using nonthermal plasma according to one aspect of the present invention, a surface of the emitter is coated with a carbon nanotube.

The device for reducing pollutants in indoor air, ambient air, or exhaust gas by using nonthermal plasma according to one aspect of the present invention may include: a support configured to connect the emitter and the rod; and covers provided at two opposite ends of the emitter based on a longitudinal direction of the emitter and configured to isolate an interior of the emitter.

In the device for reducing pollutants in indoor air, ambient air, or exhaust gas by using nonthermal plasma according to one aspect of the present invention, the emitter may be provided as a plurality of emitters, the plurality of emitters may have different lengths and vertical heights and be sequentially disposed in a longitudinal direction of the chamber, and the emitter, which has a long length or a small vertical height among the plurality of emitters, may be disposed at a downstream side based on the flow direction of the processing target gas.

In the device for reducing pollutants in indoor air, ambient air, or exhaust gas by using nonthermal plasma according to one aspect of the present invention, the insulator may be provided as a plurality of insulators, an upstream insulator, among the plurality of insulators, may be disposed as a dummy insulator to which no voltage is applied, and the processing target gas may be prevented from being in direct contact with a downstream insulator, such that a source of pollution and moisture vapor contained in the processing target gas are prevented from being accumulated on a surface of the downstream insulator.

In the device for reducing pollutants in indoor air, ambient air, or exhaust gas by using nonthermal plasma according to one aspect of the present invention, the emitter may be provided as a plurality of emitters, the plurality of emitters each may be configured as a tubular body similar to the chamber and has different diameters or sizes, the plurality of emitters may be disposed on concentric circles or the same center point while overlapping one another in a radial direction of the chamber, and the plurality of emitters may be disposed at the same interval.

The device for reducing pollutants in indoor air, ambient air, or exhaust gas by using nonthermal plasma according to one aspect of the present invention may include: an air curtain part configured as a tubular body having various shapes at least including a thin circular tube, configured to connect an exterior and interior of the chamber, disposed at an upstream side of the insulator based on the flow direction of the processing target gas, and configured to spray compressed air toward at least any one of the insulator, the upstream side of the insulator, or a front surface portion of the insulator from the outside of the chamber.

The device for reducing pollutants in indoor air, ambient air, or exhaust gas by using nonthermal plasma according to one aspect of the present invention may include a nitrogen oxide reducing metal catalyst device disposed at a downstream side of the emitter based on the flow direction of the processing target gas and configured to contain one or more materials selected from a group consisting of vanadium, zeolite, and a metal catalyst, in which the metal catalyst device may reduce nitrogen oxide in the processing target gas by facilitating a reaction of nitrogen oxide contained in the processing target gas.

The device for reducing pollutants in indoor air, ambient air, or exhaust gas by using nonthermal plasma according to one aspect of the present invention may include an ozone removing metal catalyst device disposed at a downstream side of the emitter based on the flow direction of the processing target gas and configured to contain at least one or more materials selected from a group consisting of a manganese oxide (MnOx) catalyst, a titanium dioxide ($TiO_2$) catalyst or a zeolite catalyst, and other metal catalysts, in which the ozone removing metal catalyst device may reduce ozone remaining in the processing target gas.

In the device for reducing pollutants in indoor air, ambient air, or exhaust gas by using nonthermal plasma according to one aspect of the present invention, the nitrogen oxide reducing metal catalyst device may be installed together with the air curtain part, and nitrogen and oxygen contained in the compressed air sprayed from the air curtain part may be used to facilitate a reaction of the metal catalyst of the nitrogen oxide pollutant reducing device to reduce nitrogen oxide contained in the processing target gas.

In the device for reducing pollutants in indoor air, ambient air, or exhaust gas by using nonthermal plasma according to one aspect of the present invention, the rod may include: a vertical rod extending from one side of an inner surface of the chamber to a center of the chamber; and a horizontal rod extending along a center of the chamber and having a distal end to which the emitter is coupled, the insulator may surround the vertical rod from one side of the inner surface of the chamber, and the insulator may have a length such that the vertical rod is exposed from the horizontal rod by a preset height H equal to or smaller than ½ of a vertical height h of the emitter.

In the device for reducing pollutants in indoor air, ambient air, or exhaust gas by using nonthermal plasma according to one aspect of the present invention, the chamber may include an arcing prevention chamber that is a space formed convexly outward from one side of an inner surface of the chamber, the rod may include: a vertical rod extending from one side of an inner surface of the arcing prevention chamber to a center of the chamber; and a horizontal rod extending along a center of the chamber and having a distal end to which the emitter is coupled, and a shortest distance between the horizontal rod and the inner surface of the arcing prevention chamber may be equal to or larger than a radius of the chamber, such that the arcing prevention chamber may prevent arcing between the arcing prevention chamber and the horizontal rod.

In the device for reducing pollutants in indoor air, ambient air, or exhaust gas by using nonthermal plasma according to one aspect of the present invention, the chamber may have a preset length b from the inner surface to a center point thereof, a length a of the insulator may be a length equal to or longer than the preset length b, and a horizontal length c to the vertical rod from an edge at which the arcing prevention chamber and the chamber meet may be a length equal to or shorter than a preset length of the horizontal rod.

In the device for reducing pollutants in indoor air, ambient air, or exhaust gas by using nonthermal plasma according to one aspect of the present invention, a cross-section of the arcing prevention chamber based on the flow direction of the processing target gas may have a shape selected from shapes that partially define circular, elliptical, and polygonal shapes.

In the device for reducing pollutants in indoor air, ambient air, or exhaust gas by using nonthermal plasma according to one aspect of the present invention, the arcing prevention chamber may be installed in an annular shape along a periphery of the chamber.

In the device for reducing pollutants in indoor air, ambient air, or exhaust gas by using nonthermal plasma according to one aspect of the present invention, the emitter may be positioned at a downstream side of the insulator based on the flow direction of the processing target gas to prevent the processing target gas from colliding directly with a surface of the insulator at a side of the emitter and prevent a source of pollution and moisture vapor contained in the processing target gas from being accumulated.

In the device for reducing pollutants in indoor air, ambient air, or exhaust gas by using nonthermal plasma according to one aspect of the present invention, the insulator may further include an insulator cleaning means configured to prevent the source of pollution and the moisture vapor from being accumulated on a surface thereof or remove the source of pollution and moisture vapor accumulated on the surface thereof.

In the device for reducing pollutants in indoor air, ambient air, or exhaust gas by using nonthermal plasma according to one aspect of the present invention, the insulator may be provided as a plurality of insulators, and the chamber may have a length so that at least one insulator is installed at a rear side of a most downstream insulator in order to prevent a vortex or reverse flow of the processing target gas, which occurs when the chamber disposed at the rear side of the plurality of insulators is narrowed or curved, and to prevent a source of pollution in the processing target gas from being accumulated on the plurality of insulators.

In the device for reducing pollutants in indoor air, ambient air, or exhaust gas by using nonthermal plasma according to one aspect of the present invention, the rod may include: a vertical rod extending from one side of an inner surface of the chamber to a center of the chamber; and a horizontal rod extending along the center of the chamber and having a distal end to which the emitter is coupled, the insulator may surround the entire portion from one side of the inner surface of the chamber to an end of the vertical rod, and the device may include at least any one of: an insulator lower-end outer sheath made of a metal conductor containing stainless steel and copper and configured to surround an outer surface of the insulator by a length equal to or shorter than a preset height H from a position of the horizontal rod; or an insulator upper-end outer sheath made of a metal conductor containing stainless steel and copper and configured to surround an outer surface of the insulator by a length equal to or shorter than a preset height H from one side of the inner surface of the chamber.

In the device for reducing pollutants in indoor air, ambient air, or exhaust gas by using nonthermal plasma according to one aspect of the present invention, in case that only one of the insulator upper-end outer sheath and the insulator lower-end outer sheath is included, a length of one of the insulator upper-end outer sheath and the insulator lower-end outer sheath may be equal to or smaller than ½ of a vertical height h of the emitter, and in case that both the insulator upper-end outer sheath and the insulator lower-end outer sheath are included, a sum of a length of the insulator upper-end outer sheath and a length of the insulator lower-end outer sheath may be equal to or smaller than ½ of the vertical height h of the emitter.

The device for reducing pollutants in indoor air, ambient air, or exhaust gas by using nonthermal plasma according to one aspect of the present invention may include a heat generation device configured to surround an outer surface of the chamber and configured as a heat generation insulator or included in the device, in which the heat generation device may prevent arcing caused by condensation of moisture vapor contained in the processing target gas at a point in time at which the processing target gas begins to be produced.

In the device for reducing pollutants in indoor air, ambient air, or exhaust gas by using nonthermal plasma according to one aspect of the present invention, the emitters may be provided at front and rear sides of the vertical rod based on the flow direction of the processing target gas.

In the device for reducing pollutants in indoor air, ambient air, or exhaust gas by using nonthermal plasma according to one aspect of the present invention, upper and lower ends of the insulator may be made of two or more different electrically insulating materials or outer and inner portions of the insulator may be made of two or more different electrically insulating materials.

In the device for reducing pollutants in indoor air, ambient air, or exhaust gas by using nonthermal plasma according to one aspect of the present invention, in case that direct current is supplied to the power supply device, the direct current may be supplied after polarities of the direct current are reversed according to a preset time period to detach a source of pollution contained in the processing target gas and adsorbed in the chamber.

The device for reducing pollutants in indoor air, ambient air, or exhaust gas by using nonthermal plasma according to one aspect of the present invention may include a bundle of unit chambers disposed in a flow path of the processing target gas of the chamber and configured to divide an entire vertical cross-section into a plurality of cross-sections in the flow direction of the processing target gas, in which a plurality of unit chambers, which constitutes the bundle of unit chambers, has cross-sections having the same shape, in which the emitter is disposed at a center of an interior of each of the plurality of unit chambers, in which an outer surface of the emitter is similar in shape to an inner surface of the unit chamber, and in which the emitter is always positioned at a predetermined position within a shortest distance from any position on the outer surface of the emitter to the inner surface of the unit chamber.

In the device for reducing pollutants in indoor air, ambient air, or exhaust gas by using nonthermal plasma according to one aspect of the present invention, the emitter may be provided as a pair of emitters provided at front and rear sides of the vertical rod based on the flow direction of the processing target gas.

In the device for reducing pollutants in indoor air, ambient air, or exhaust gas by using nonthermal plasma according to one aspect of the present invention, the vertical or horizontal rods may be divided into two or more vertical or horizontal rods in a longitudinal direction, the device may further include an insulation member disposed to be inserted into the separated vertical or horizontal rods so that the separated vertical or horizontal rods is connected in the longitudinal direction, the insulation member may allow electric current to smoothly flow between the separated vertical or horizontal rods when voltage higher than preset limit voltage is applied between the separated vertical or horizontal rods, and the insulation member may block a flow of electric current between the separated vertical or horizontal rods when voltage equal to or lower than the preset limit voltage is applied between the separated vertical or horizontal rods.

Advantageous Effects

According to the present disclosure, the emitter is configured as a tubular body, such that the emitter may be manufactured to be light in weight. Further, the plasma generation surface area may be increased, thereby improving efficiency in generating plasma.

According to the present disclosure, the tubular body type emitter may be used to prevent deterioration in efficiency in generating plasma caused by arcing.

According to the present disclosure, the dummy insulator is installed at the foremost side of the insulators, which makes it possible to prevent deterioration in efficiency in generating plasma caused by arcing.

According to the present disclosure, the plurality of chambers is installed in the tube, which makes it possible to prevent deterioration in efficiency in generating plasma caused by arcing.

According to the present disclosure, the air curtain structure may be adopted to prevent arcing on the surface of the insulator, thereby preventing deterioration in efficiency in generating plasma caused by arcing, and improving efficiency in reducing nitrogen oxide (NOx) by using the injected air and the catalyst.

According to the present disclosure, the arcing prevention chamber, which is convexly shaped to the outside of the chamber at the portion where the insulator is disposed, may be adopted, such that the distance between the rod and the chamber, between which arcing mainly occurs, is relatively longer than the distance between the chamber and the tubular body type emitter, which makes it possible to prevent arcing therebetween and improve the effect of preventing arcing.

According to the present disclosure, the insulator cleaning means may be adopted to remove the pollutants or moisture vapor on the surface of the insulator, which makes it possible to prevent arcing caused by the pollutants or moisture vapor, and improve efficiency in generating plasma.

BRIEF DESCRIPTION OF DRAWINGS

FIGS. 27, 28, 29, 30, 31, 32, 33, 34, 35 and 36 are views illustrating the embodiment of the device for reducing pollutants in indoor air, ambient air, or exhaust gas by using nonthermal plasma according to the present disclosure in which an interior of the chamber is divided.

MODES OF THE INVENTION

Hereinafter, embodiments of a device for reducing pollutants in indoor air, ambient air, or exhaust gas by using nonthermal plasma according to the present disclosure will be described in detail with reference to the drawings.

However, it should be noted that the intrinsic technical spirit of the present disclosure is not limited by the following exemplary embodiment, and the following exemplary embodiment may easily be substituted or altered by those skilled in the art based on the intrinsic technical spirit of the present disclosure.

In addition, the terms used herein are selected for convenience of description and should be appropriately interpreted as a meaning that conform to the technical spirit of the present disclosure without being limited to a dictionary meaning when recognizing the intrinsic technical spirit of the present disclosure.

Figure 1:
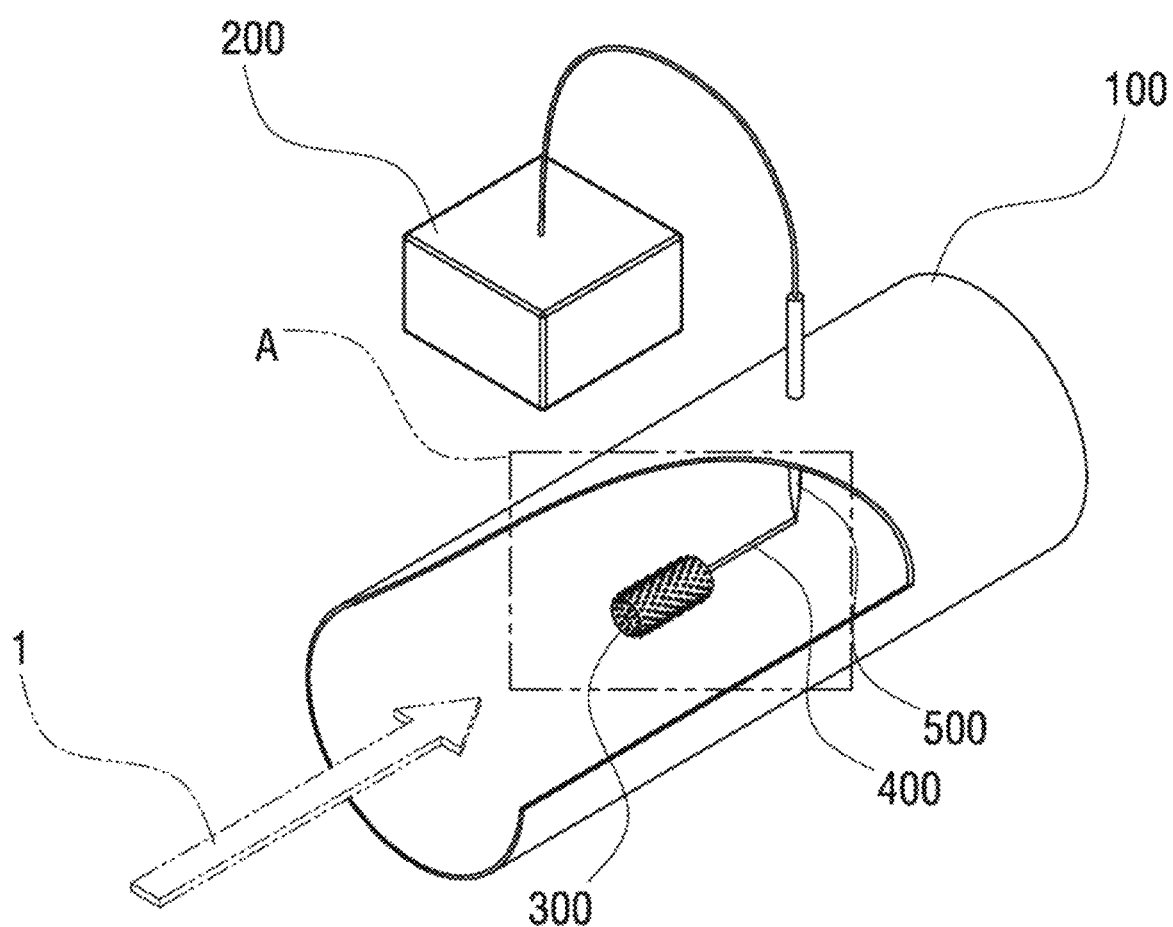
FIG. 1 is a view for explaining an embodiment of a device for reducing pollutants in indoor air, ambient air, or exhaust gas by using nonthermal plasma according to the present disclosure.
Figure 2:
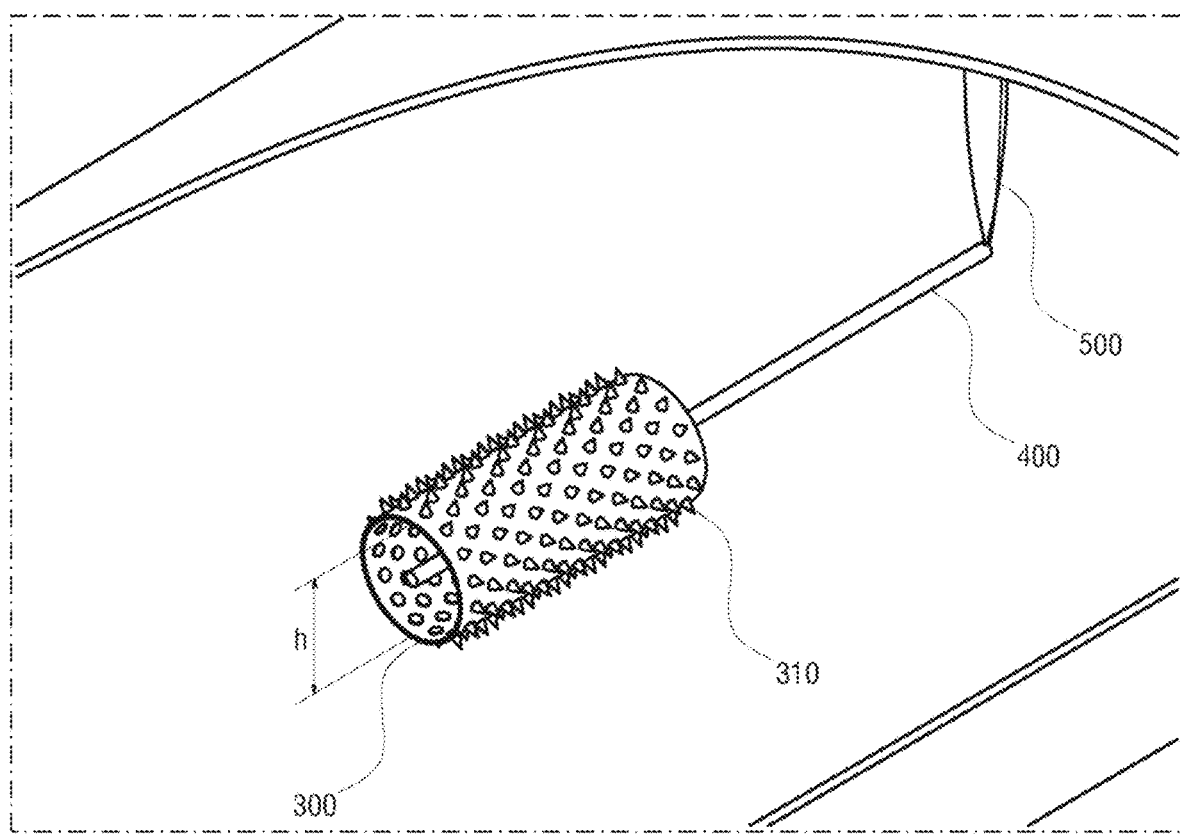
FIG. 2 is an enlarged view of region A in FIG. 1.

FIG. 1 is a view for explaining an embodiment of a device for reducing pollutants in indoor air, ambient air, or exhaust gas by using nonthermal plasma according to the present disclosure, and FIG. 2 is an enlarged view of region A in FIG. 1.

FIG. 1 illustrates a state in which a part of the chamber 100 is cut out and removed.

As can be seen in FIGS. 1 and 2, the device for reducing pollutants in indoor air, ambient air, or exhaust gas by using nonthermal plasma according to the present embodiment includes a chamber 100, a power supply device 200, an emitter 300, a rod 400, and an insulator 500.

The chamber 100 is a tubular body in which indoor air, ambient air, and exhaust gas flow (1). A ground power source is connected to the chamber 100.

The power supply device 200 is disposed outside the chamber 100 and continuously applies voltage set as direct current or alternating current.

The emitter 300 is provided in the form of a hollow tubular body and has a plurality of cusps disposed on an outer surface of the emitter 300 and configured to generate plasma.

The emitter 300 is disposed in the chamber 100 and elongated in a direction parallel to a flow direction of indoor air, ambient air, and exhaust gas. The emitter 300 is electrically connected to the power supply device 200. The emitter 300 generates nonthermal plasma by means of a difference in voltage between the emitter 300 and the chamber 100.

The rod 400 electrically connects the emitter 300 and the power supply device 200 and supports the emitter 300 so that the emitter 300 is disposed at a center of the interior of the chamber 100.

The insulator 500 electrically insulates the rod 400 and the chamber 100 and prevents arcing occurring between the rod 400 and the chamber 100.

Referring to FIGS. 1 and 2, the device for reducing pollutants in indoor air, ambient air, or exhaust gas by using nonthermal plasma according to the present disclosure is provided in the form of a hollow tubular body that may be advantageously manufactured to be larger in size and lighter in weight than a round bar type device.

Electrons flow to a surface of a conductor. Therefore, as a surface area of the emitter 300 increases, a larger plasma generation area may be implemented.

That is, the tubular emitter 300 according to the present disclosure illustrated in FIGS. 1 and 2 is more effective in increasing the plasma generation area.

In addition, the emitter 300 according to the present disclosure has the cusps 310, such that the surface area of the emitter 300 is further increased, and plasma is smoothly diffused from the cusps 310.

In case that the cusps 310 are formed on the outer surface of the emitter 300, an interval between the emitter 300 and an inner surface of the chamber 100 decreases as the size of the emitter 300 increases.

In contrast, a distance between the rod 400 and the chamber 100 is not changed even though the size of the emitter 300 increases.

The flow of electricity (electrons) occurs at a shortest distance between positive and negative electrodes of the electricity. Therefore, the electricity flows through portions between the protruding ends of the cusps 310 and the chamber 100 that have intervals relatively smaller than the interval between the rod 400 and the chamber 100. As a result, electric discharge is smoothly generated from the emitter 300, and plasma is also smoothly generated.

In addition, referring to FIGS. 1 and 2, in the device for reducing pollutants in indoor air, ambient air, or exhaust gas by using nonthermal plasma according to the present embodiment, a most desirable ratio between the surface area of the emitter 300 and the area of the inner surface of the chamber 100 corresponding to a length of the emitter 300 is 1:1.

However, because the emitter 300 is disposed in the chamber 100, the surface area of the emitter 300 is typically smaller than an orthogonal projection area of the interior of the chamber 100.

Therefore, the efficiency in generating nonthermal plasma increases as the most desirable ratio between the surface area of the emitter 300 and the area of the inner surface of the chamber 100 corresponding to the length of the emitter 300 approaches the ratio of 1:1.

To this end, the surface of the emitter 300 including the cusps 310 may be preferably coated with carbon nanotubes (CNT) having a large specific surface area.

Therefore, the surface area of the emitter 300 is increased by the carbon nanotubes (CNT), which makes it possible to increase the efficiency in generating nonthermal plasma and prevent the occurrence of ozone that is generated when plasma is generated.

The ratio further approaches or becomes equal to 1:1 as a vertical height h of the tubular body of the emitter 300 increases and as a surface area of the cusp 310 increases or the number of cusps 310 increases.

In case that a cross-section of the emitter 300 in a height direction has a circular shape, the vertical height h of the emitter 300 is a diameter of the circular shape.

In addition, in the device for reducing pollutants in indoor air, ambient air, or exhaust gas by using nonthermal plasma according to the present disclosure, a cross-sectional shape of each of the chamber 100 and the emitter 300 in the height direction may be a circular, elliptical, or polygonal shape.

In the device for reducing pollutants in indoor air, ambient air, or exhaust gas by using nonthermal plasma according to the present disclosure, the pollutants may include pollutants contained in processing target gas discharged from an external combustion engine or an internal combustion engine such as a diesel engine, a gasoline engine, or a boiler. The pollutants may include contaminated indoor air in a factory, a building, or an agricultural or livestock facility. The pollutants may include pollutants existing in contaminated air at a location where factories, buildings, or agricultural or livestock facilities are densely located.

Figure 3:
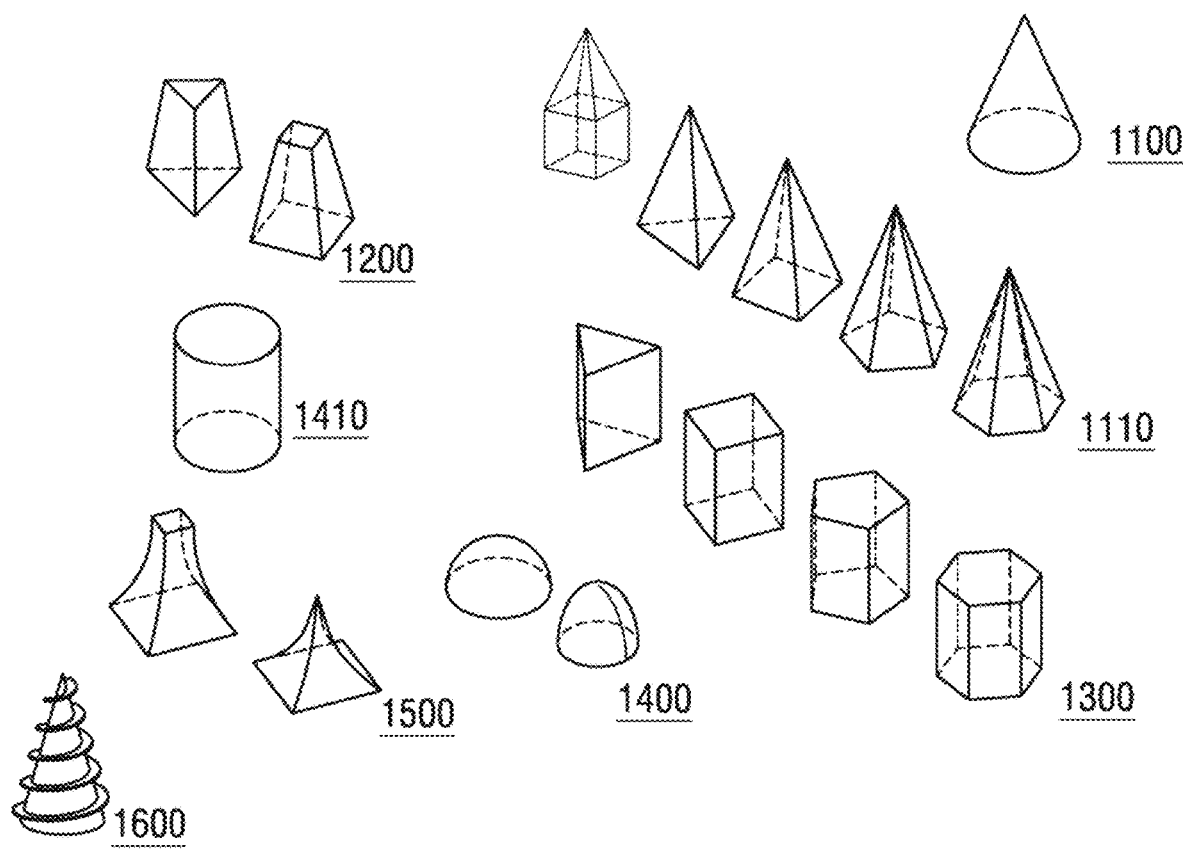
FIG. 3 is a view illustrating various embodiments of cusp shapes.

FIG. 3 is a view illustrating various embodiments of cusp shapes.

Referring to FIG. 3, the cusps 310 provided on the emitter 300 has first cusp shapes including conical shapes 1100, hemispherical and elliptical hemispherical shapes 1400, cylindrical shapes 1410, pyramidal shapes 1110, truncated pyramidal shapes 1200, and prismatic shapes 1300, second cusp shapes such as shapes 1500 in which a part or the entirety of a lateral surface of the first cusp shape has a curved surface having a circular or elliptical shape or the like instead of a flat surface, third cusp shapes such as shapes 1600 in which screw threads, screw troughs, or serrated teeth are spirally formed from upper ends to lower ends of lateral surfaces of the first and second cusp shapes, and shapes formed as a combination of the first cusp shape, the second cusp shape, and the third cusp shape.

The shape formed as the combination of the first cusp shape, the second cusp shape, and the third cusp shape may of course mean that the plurality of cusps 310 has various shapes and also mean that the shape of each of the cusps 310 may be formed as a combination of various shapes.

That is, the shape of the cusp 310 includes a cylinder shape, an elliptical cylindrical shape, a pyramidal shape, a prismatic shape such as a conical shape, a hemispherical shape, an elliptical hemispherical shape, a spherical shape, a cylindrical shape, a quadrangular pyramidal shape, and a truncated pyramidal shape, a shape in which a part or the entirety of a lateral surface of one of the above-mentioned shapes has a curved surface having a circular or elliptical shape or the like instead of a flat surface, a shape in which screw threads, screw troughs, or serrated teeth are spirally formed on a part of or from an upper end to a lower end of a lateral surface of one of the above-mentioned shapes, and shapes, which are derived from the above-mentioned shapes, including vertex division, upper-end surface division, unevenness at an upper-end surface center point, or modification such as a combination of these shapes.

Figure 4:
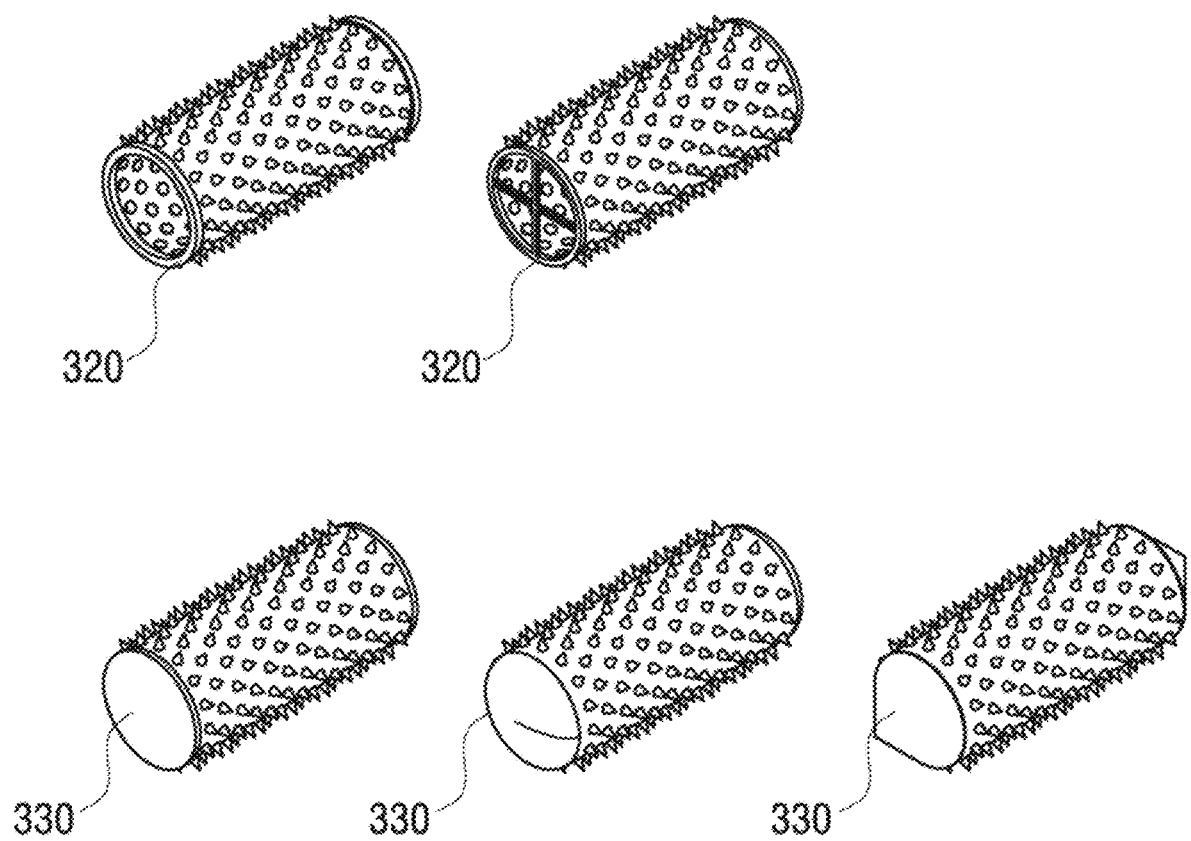
FIG. 4 is a view illustrating various embodiments of covers and supports.

FIG. 4 is a view illustrating various embodiments of covers and supports.

Referring to FIG. 4, the device for reducing pollutants in indoor air, ambient air, or exhaust gas by using nonthermal plasma according to the present disclosure has a support 320 and a cover 330.

The support 320 is provided as a single support or a plurality of supports. The support 320 is installed in the emitter or at the end of the emitter and connects the 400 and the emitter 300.

The cover 330 is provided at one end or two opposite ends of a front side of the emitter 300 based on a longitudinal direction of the emitter and a flow direction of the processing target gas. The cover 330 isolates the interior of the emitter 300.

In addition, the cover 330 may connect the emitter 300 and the rod 400.

A cover at least including a conical shape, a hemispherical shape, and a flat shape may be installed as the cover 330. The covers 330 may block the introduction of the processing target gas into the tubular body shape of the emitter 300.

Figure 5:
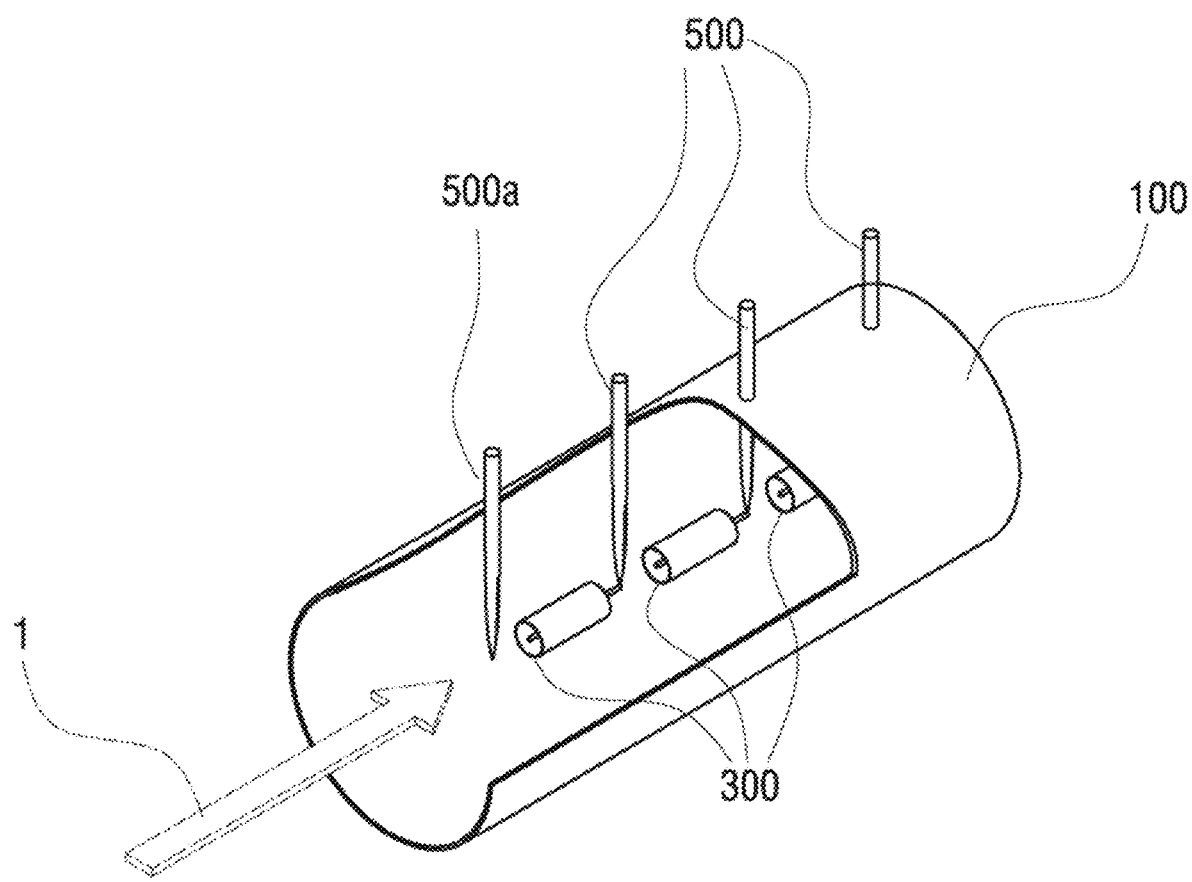
FIG. 5 is a view illustrating the embodiment of the device for reducing pollutants in indoor air, ambient air, or exhaust gas by using nonthermal plasma according to the present disclosure that has a plurality of emitters arranged sequentially.

FIG. 5 is a view illustrating the embodiment of the device for reducing pollutants in indoor air, ambient air, or exhaust gas by using nonthermal plasma according to the present disclosure that has a plurality of emitters arranged sequentially.

FIG. 5 illustrates a state in which a part of the chamber 100 is cut out and removed. The cusps on the outer surface of the emitter 300 are omitted.

Referring to FIG. 5, in the device for reducing pollutants in indoor air, ambient air, or exhaust gas by using nonthermal plasma according to the present embodiment, the plurality of emitters 300 is sequentially disposed in the longitudinal direction of the chamber 100 while having different lengths and vertical heights h.

In this case, the emitter, which is long in length among the plurality of emitters 300, is disposed at a downstream side based on a flow direction 1 of the processing target gas. Alternatively, the emitter, which is small in vertical height among the plurality of emitters 300, is disposed at the downstream side based on the flow direction 1 of the processing target gas.

In case that the shape of the emitter 300 in the vertical height direction is a circular shape, the vertical height of the emitter 300 may be a diameter.

In case that the plurality of emitters 300 is disposed in series to sequentially reduce the pollutants in the processing target gas, the length and vertical heights of the emitters 300 vary depending on the arrangement order of the emitters, such that the emitter 300, which is disposed at the front end, is short in length and large in vertical height h. Therefore, the distance between the cusp 310 and the inner surface of the chamber 100 decreases, which makes it possible to decrease the voltage to be applied.

This may reduce a degree of fatigue of the power supply device 200, increase a lifespan of the power supply device 200, and prevent unnecessary arcing between the rod 400 and the chamber 100.

That is, the length of the emitter 300 increases in a direction from the upstream pollutant reducing device toward the downstream pollutant reducing device among the disposed pollutant reducing devices. Therefore, it is possible to reduce a degree of fatigue of the upstream pollutant reducing device based on the series arrangement order. Therefore, the initially disposed emitter 300 has the shortest length, and the last disposed emitter has the longest length.

Likewise, the vertical height h of the emitter 300 also varies depending on the order of installing the pollutant reducing devices. The vertical height h of the emitter 300 decreases in the direction from the most upstream pollutant reducing device toward the downstream pollutant reducing device. Therefore, it is possible to reduce the degree of fatigue of the upstream pollutant reducing device. As the vertical height h of the emitter 300 increases, the applied voltage may be low in contrast. The initially disposed emitter 300 has the largest diameter, and the last disposed emitter 300 has the smallest diameter.

Therefore, in case that the vertical height h and the length of the emitter 300 are adjusted, the power supply device may adjust the applied voltage suitable for each of the emitters 300 in consideration of the height of the chamber 100, the vertical height h and the length of the emitter 300, and the like and then supply the voltage, which makes it possible to prevent arcing, increase the efficiency in reducing the pollutants, and reduce a degree of fatigue of the power supply device 200.

In addition, referring to FIG. 5, in the device for reducing pollutants in indoor air, ambient air, or exhaust gas by using nonthermal plasma according to the present embodiment, a plurality of insulators is provided. The upstream insulator, among the plurality of insulators, is disposed as a dummy insulator 500a to which no voltage is applied.

The dummy insulator 500a prevents the processing target gas from coming into direct contact with the downstream insulator, thereby preventing the source of pollution included in the processing target gas from being accumulated on a surface of the downstream insulator.

In addition, the dummy insulator 500a may prevent unnecessary arcing caused by an increase in concentration of the source of pollution in the processing target gas at the periphery of the downstream insulator.

In addition, in case that back pressure is generated as the chamber, which is connected to rear sides of the plurality of insulators disposed in a row in the direction of the processing target gas as illustrated in FIG. 5, is narrowed or curved, a rear spacing distance, which is a distance in which at least one insulator or one or more insulators may be installed at the rear side of the endmost insulator, needs to be ensured and connected to the chamber to prevent the vortex or reverse flow of the processing target gas, prevent the source of pollution in the processing target gas from being accumulated on the insulator because of the vortex or reverse flow of the processing target gas, and prevent arcing caused by the accumulated source of pollution.

In this case, within the distance in which one or more insulators may be installed, a distance of one insulator is a distance between the two adjacent insulators among the plurality of insulators disposed in a row.

In addition, when the chamber connected to the rear sides of the plurality of insulators disposed in a row is narrowed or curved, the rear spacing distance increases as a degree to which the chamber is narrowed or an angle at which the chamber is curved increases.

That is, when a degree to which the shape of the chamber connected to the rear sides of the plurality of insulators disposed in a row is different from the shape of the chamber in which the plurality of insulators is arranged is high, the rear spacing distance may be increased, such that the vortex or reverse flow of the processing target gas may be prevented, the source of pollution in the processing target gas may be prevented from being accumulated on the insulator, and the space may be ensured to the extent of the rear spacing distance.

Figure 6:
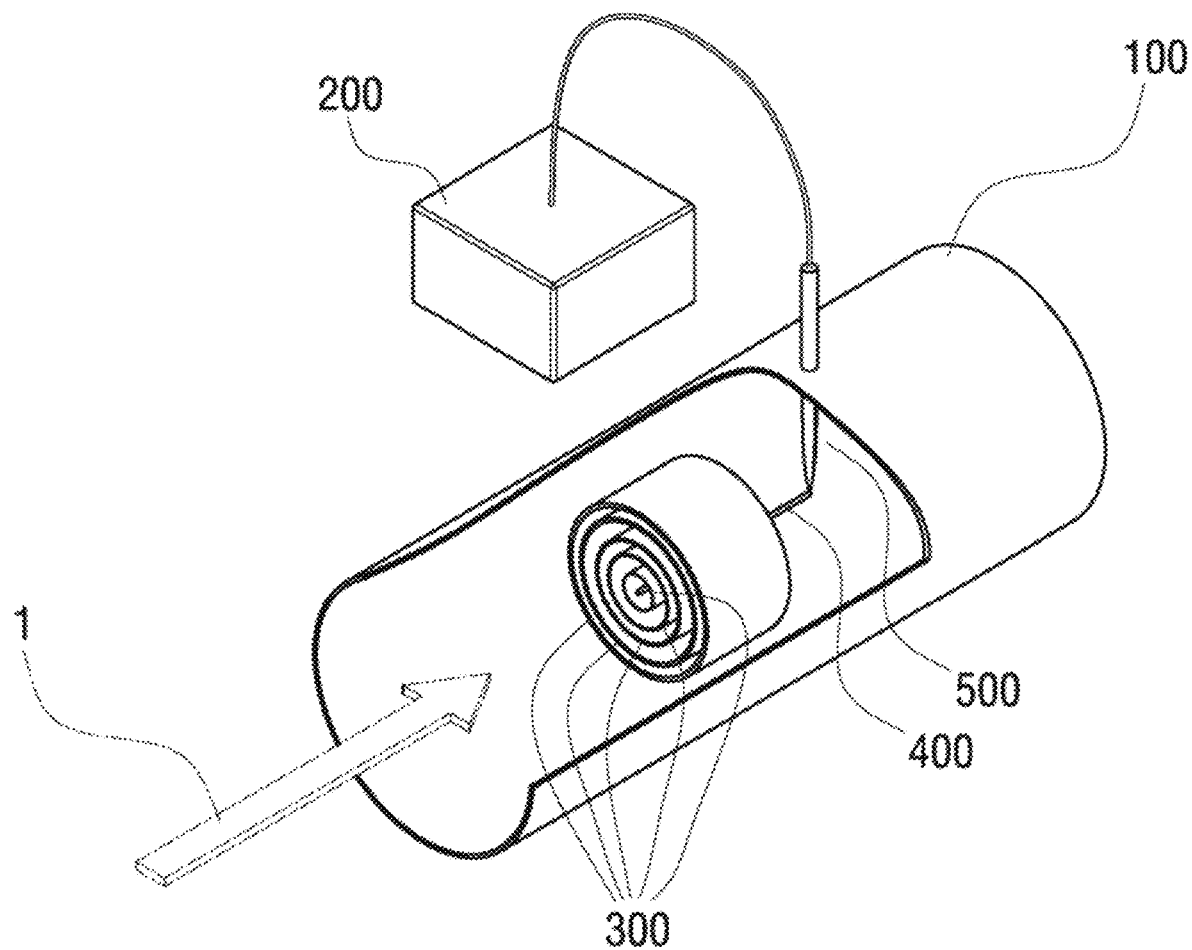
FIG. 6 is a view illustrating the embodiment of the device for reducing pollutants in indoor air, ambient air, or exhaust gas by using nonthermal plasma according to the present disclosure that has a plurality of emitters disposed on concentric circles.

FIG. 6 is a view illustrating the embodiment of the device for reducing pollutants in indoor air, ambient air, or exhaust gas by using nonthermal plasma according to the present disclosure that has emitters disposed on concentric circles.

FIG. 6 illustrates a state in which a part of the chamber 100 is cut out and removed. The cusps on the outer surface of the emitter 300 are omitted.

Referring to FIG. 6, in the device for reducing pollutants in indoor air, ambient air, or exhaust gas by using nonthermal plasma according to the present embodiment, the emitters 300 are configured as a plurality of cylindrical or elliptical tubular bodies having different diameters or a plurality of polygonal tubular bodies having similar shapes and different sizes. The emitters 300 are disposed on concentric circles or the same center point while overlapping one another in a radial direction of the chamber 100. The plurality of emitters is disposed at equal intervals.

In this case, the chamber 100 has the same cross-sectional shape as the plurality of emitters 300 disposed on the concentric circle or the same center point.

When viewed from the vertically cut plane of the chamber 100 in the fluid flow direction, the tubular body emitters 300, which are configured as concentric circles disposed at predetermined intervals between the emitters 300 and the chamber center of the chamber, are installed in layers. The voltage is decreased in a direction from the innermost emitter 300 to the outermost emitter 300, and the same voltage difference is set between the emitters 300, such that the voltage difference between the emitters 300 is equal to the voltage difference between the outermost emitter 300 and the chamber 100.

Unlike the configuration in which the single emitter 300 applies the voltage to the chamber 100, a subtraction voltage is calculated by dividing the voltage applied between the emitters 300 and the voltage applied between the outermost emitter 300 and the chamber 100 by "the number of emitters". According to the order of the emitters disposed from the center, the power is supplied such that the voltage, which is applied originally, is applied to the first emitter, the voltage, which is made by subtracting the "subtraction voltage x1" from the originally applied voltage, is applied to the second emitter, and the voltage, which is made by subtracting the "subtraction voltage x2" from the originally applied voltage, is applied to the third emitter.

This configuration is expressed by the equations of "Voltage applied in order of the emitters=Originally applied voltage−Subtraction voltage×(Order of emitter−1)" and "Subtraction voltage=Originally applied voltage/Number of emitters".

However, the plurality of rods is embedded in the insulator 500. In the case of the circular emitter 300, the rods need to be connected to upper or lower ends of the circles of all the emitters 300. Alternatively, each of the emitters needs to be inserted into a groove of the rod provided in the insulator 500 and connected to the rod in the insulator 500.

Figure 7:
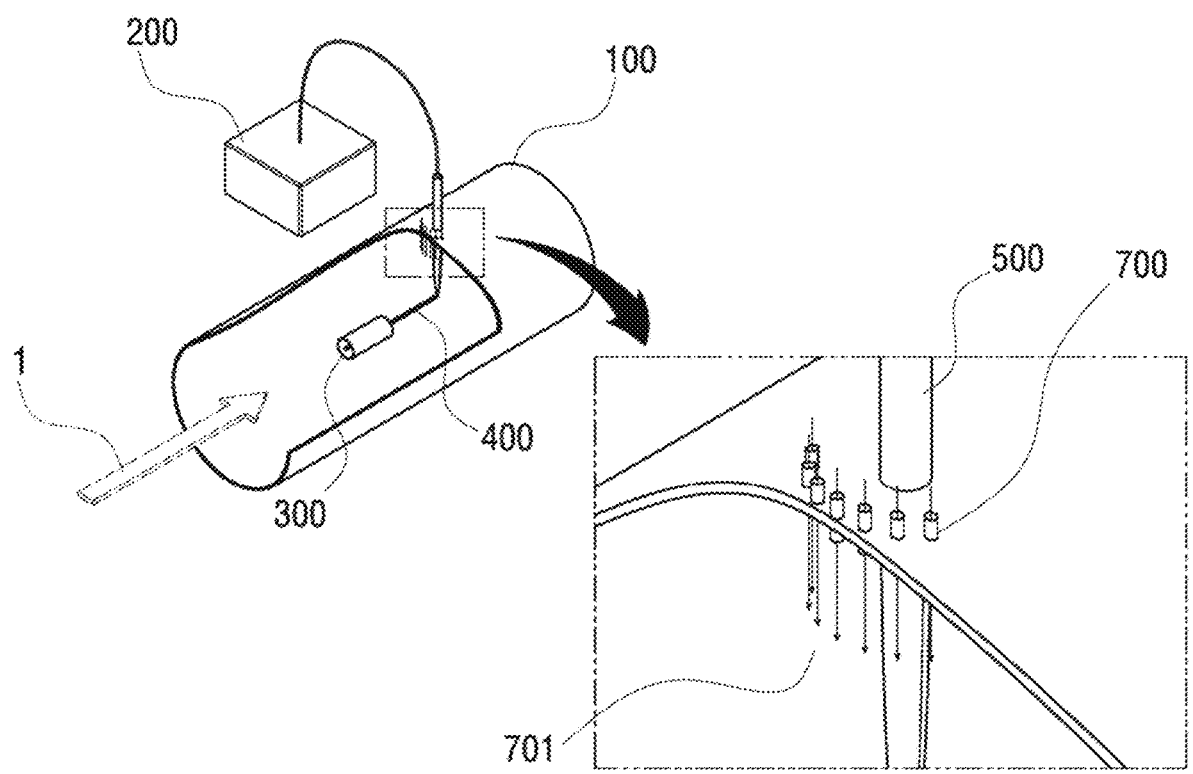
FIG. 7 is a view illustrating the embodiment of the device for reducing pollutants in indoor air, ambient air, or exhaust gas by using nonthermal plasma according to the present disclosure that has an air curtain part.

FIG. 7 is a view illustrating the embodiment of the device for reducing pollutants in indoor air, ambient air, or exhaust gas by using nonthermal plasma according to the present disclosure that has an air curtain part.

Referring to FIG. 7, the device for reducing pollutants in indoor air, ambient air, or exhaust gas by using nonthermal plasma according to the present embodiment has air curtain parts 700.

The air curtain parts 700 are configured as tubular bodies having various shapes including thin circular tubes that connect the interior and exterior of the chamber 100.

In addition, the air curtain parts 700 are disposed at the upstream side of the insulator 500 based on the flow direction of the processing target gas. The air curtain part 700 sprays compressed air from the outside of the chamber 100 toward at least one of a front surface portion of the insulator 500 and the insulator 500.

The air curtain part 700 prevents the pollutants in the processing target gas from being accumulated on the surface of the insulator 500 to a predetermined level or higher and prevents arcing from occurring along the pollutants on the surface of the insulator 500, thereby preventing deterioration in efficiency in generating plasma.

The air curtain part 700 strongly blows outside clean air onto the surface of the insulator 500 and forms a kind of air curtain 701 at a front end of the insulator 500, thereby preventing the pollutants from being accumulated on the front end surface of the insulator 500, and reducing a concentration of the pollutants at the periphery of the surface of the insulator 500 and a concentration of moisture vapor. Therefore, it is possible to prevent the voltage of 30 kV DC/cm, which corresponds to dielectric breakdown strength of general air (ambient air), from being rapidly dropped to the voltage at a low level (e.g., 10 kV DC/cm or less) of dielectric breakdown voltage of the processing target gas because of a high concentration of the pollutants and moisture vapor in the processing target gas, thereby preventing arcing.

In addition, the device for reducing pollutants in indoor air, ambient air, or exhaust gas by using nonthermal plasma according to the present embodiment may have a nitrogen oxide reducing metal catalyst device disposed at the downstream side of the air curtain part 700. The metal catalyst device may reduce the amount of nitrogen oxide in the processing target gas by facilitating a reaction of oxygen contained in the compressed air, nitrogen, and nitrogen oxide contained in the processing target gas.

Particularly, the nitrogen oxide reducing metal catalyst device may include at least any one of vanadium and zeolite as a mixture of metallic materials.

The device for reducing pollutants in indoor air, ambient air, or exhaust gas by using nonthermal plasma according to the present embodiment may have an ozone removing metal catalyst device disposed at the downstream side of the emitter and allow the metal catalyst to remove ozone remaining in the processing target gas in the chamber.

The ozone removing metal catalyst may include at least any one of manganese oxide (MnOx), titanium dioxide (TiO2), and zeolite as a mixture of metallic materials.

In addition, in the device for reducing pollutants in indoor air, ambient air, or exhaust gas by using nonthermal plasma according to the present disclosure, the nitrogen oxide reducing metal catalyst device is installed together with the air curtain part. Therefore, nitrogen and oxygen contained in the compressed air sprayed from the air curtain part may be used to facilitate the reaction of the metal catalyst of the nitrogen oxide pollutant reducing device to reduce nitrogen oxide contained in the processing target gas.

Figure 8:
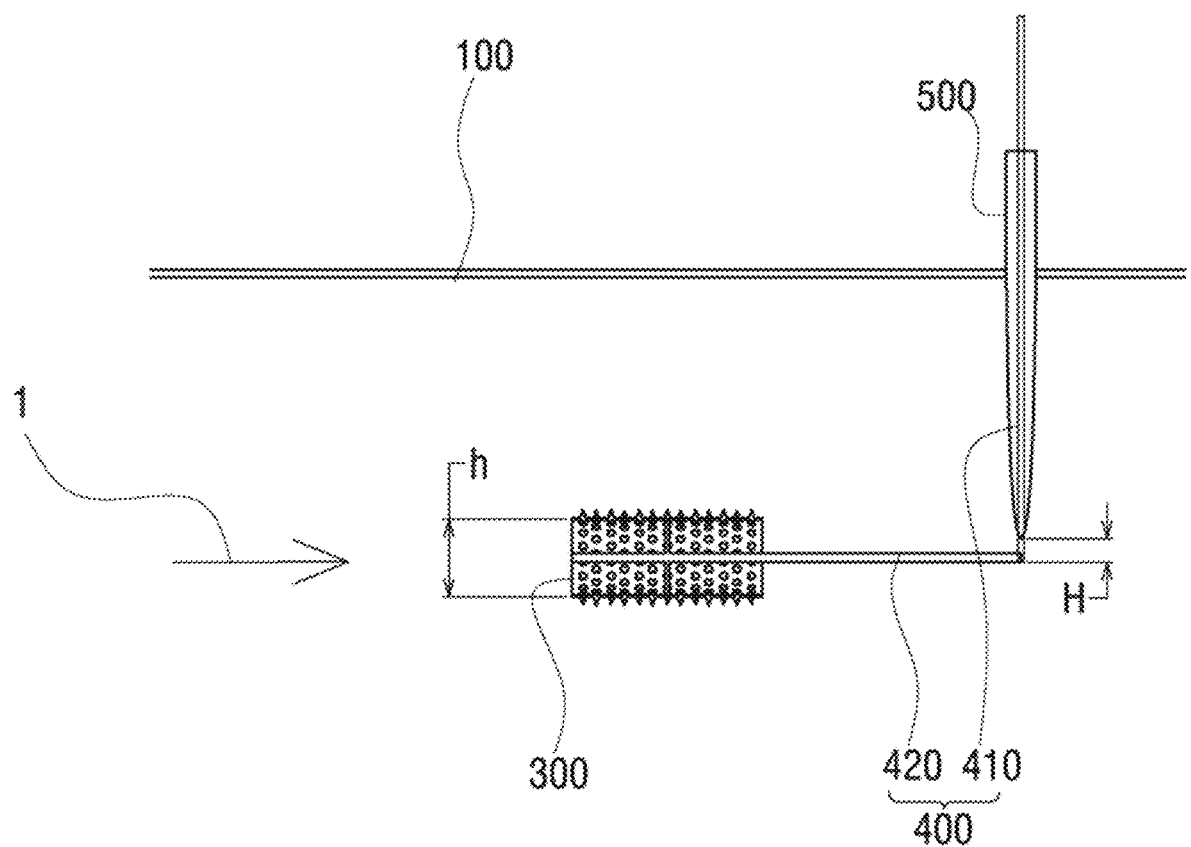
FIG. 8 is a view illustrating a cross-section of another embodiment of the device for reducing pollutants in indoor air, ambient air, or exhaust gas by using nonthermal plasma according to the present disclosure based on a flow direction of processing target gas.

FIG. 8 is a view illustrating a cross-section of another embodiment of the device for reducing pollutants in indoor air, ambient air, or exhaust gas by using nonthermal plasma according to the present disclosure based on a flow direction of processing target gas.

Referring to FIG. 8, in the device for reducing pollutants in indoor air, ambient air, or exhaust gas by using nonthermal plasma according to the present embodiment, the rod 400 has a vertical rod 410 and a horizontal rod 420.

The vertical rod 410 extends from one side of the inner surface of the chamber 100 to the center of the chamber 100. In addition, the horizontal rod 420 extends along a center of the chamber 100, and the emitter 300 is coupled to a distal end of the horizontal rod 420.

The insulator 500 surrounds the vertical rod 410 from one side of the inner surface of the chamber 100. The insulator 500 may have a length so that the vertical rod 410 is exposed from the horizontal rod 420 by a preset height H.

The preset height H is ½ or less of the vertical height h of the emitter 300.

Figure 9:
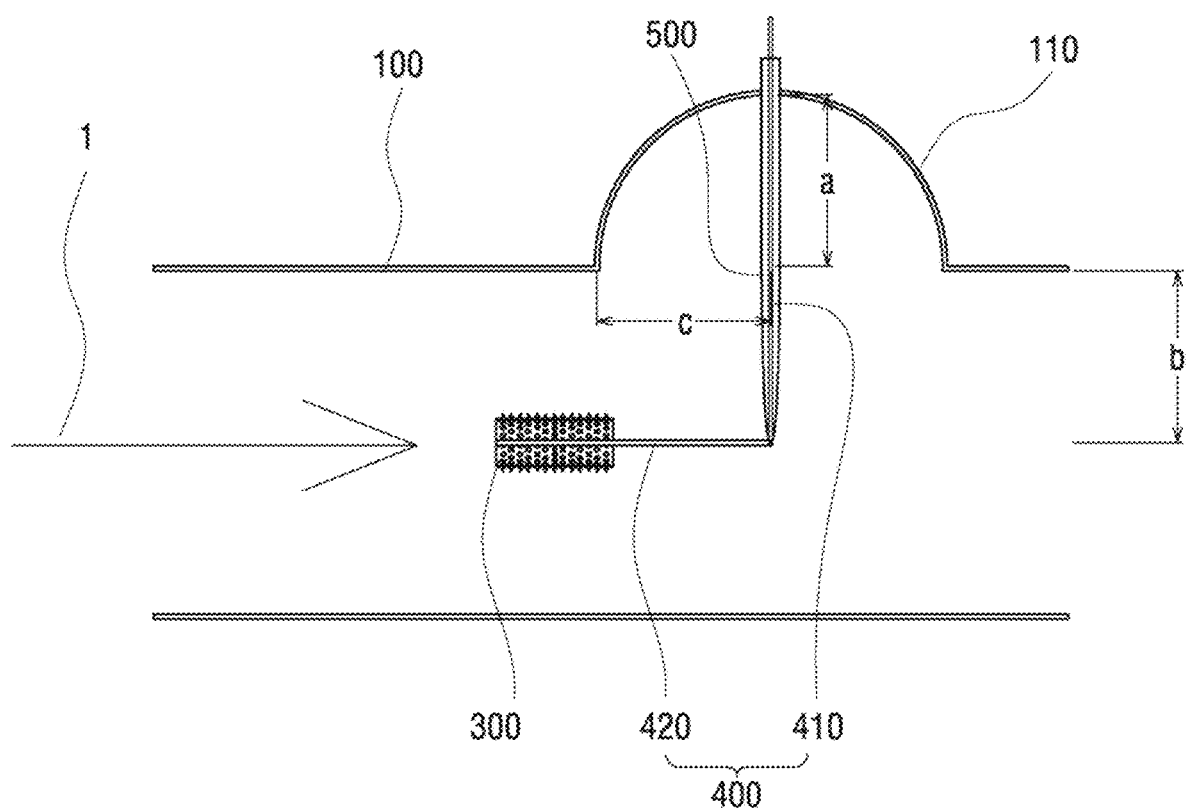
FIG. 9 is a view illustrating a cross-section of other various embodiments of the device for reducing pollutants in indoor air, ambient air, or exhaust gas by using nonthermal plasma according to the present disclosure based on the flow direction of the processing target gas.

FIG. 9 is a view illustrating a cross-section of other various embodiments of the device for reducing pollutants in indoor air, ambient air, or exhaust gas by using nonthermal plasma according to the present disclosure based on the flow direction of the processing target gas, the device having an arcing prevention chamber.

Referring to FIG. 9, in the device for reducing pollutants in indoor air, ambient air, or exhaust gas by using nonthermal plasma according to the present embodiment, the chamber 100 has an arcing prevention chamber 110.

The arcing prevention chamber 110 is a space convexly formed outward at one side of the inner surface of the chamber 100.

In this case, the rod 400 has the vertical rod 410 extending from one side of the inner surface of the arcing prevention chamber 110 to the center of the chamber 100, and the horizontal rod 420 extending along the center of the chamber 100 and having the distal end to which the emitter is coupled.

A shortest distance between the horizontal rod 420 and an inner surface of the arcing prevention chamber 110 is larger than a radius of the chamber 100, such that the arcing prevention chamber 110 may prevent arcing between the arcing prevention chamber 110 and the horizontal rod 420.

In addition, as illustrated in FIG. 9, in the device for reducing pollutants in indoor air, ambient air, or exhaust gas by using nonthermal plasma according to the present embodiment, the chamber 100 has a preset length b.

In this case, a length a of the insulator 500 from an upper end of the vertical rod 410 may be equal to or longer than the preset length b.

In addition, in this case, a horizontal length c from an edge, at which the arcing prevention chamber 110 and the chamber 100 meet, to the vertical rod 410 is equal to or shorter than the preset length of the horizontal rod 420.

Therefore, the orthogonal projection of the emitter 300 is positioned on the inner surface of the chamber 100, and the distance between the emitter 300 and the chamber 100 is shorter than the distance between the horizontal rod 420 and the inner surface of the arcing prevention chamber 110, such that arcing between the horizontal rod 420 and the arcing prevention chamber 110 is prevented.

A cross-section of the arcing prevention chamber 110 based on the flow direction 1 of the processing target gas may have a shape selected from shapes that partially define circular, elliptical, and polygonal shapes.

In addition, the arcing prevention chamber 110 may be installed in an annular shape along a periphery of the chamber 100 in a part or the entirety of the periphery of the chamber 100.

Figure 10:
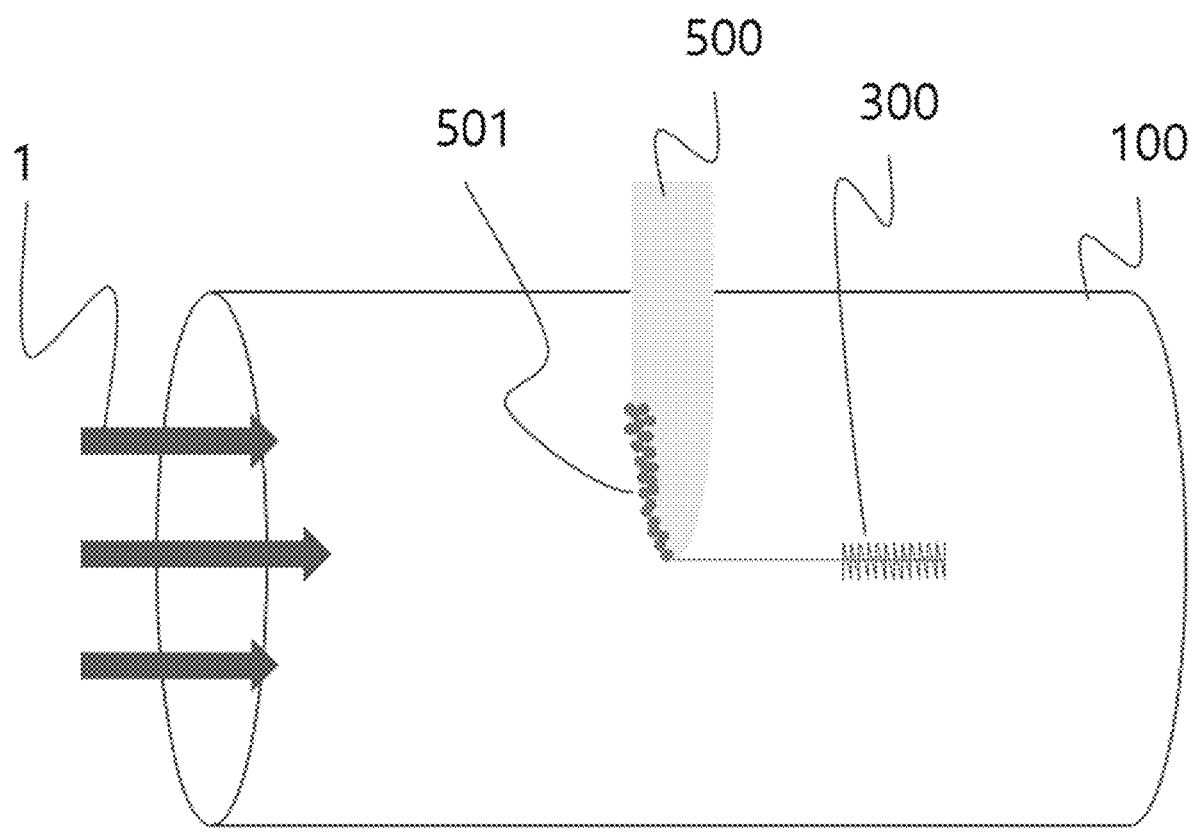
FIG. 10 is a view illustrating the embodiment of the device for reducing pollutants in indoor air, ambient air, or exhaust gas by using nonthermal plasma according to the present disclosure that has a reverse emitter.

FIG. 10 is a view illustrating the embodiment of the device for reducing pollutants in indoor air, ambient air, or exhaust gas by using nonthermal plasma according to the present disclosure that has a reverse emitter.

Referring to FIG. 10, in the device for reducing pollutants in indoor air, ambient air, or exhaust gas by using nonthermal plasma according to the present embodiment, the emitter 300 is positioned at the downstream side based on the flow direction 1 of the processing target gas.

Therefore, the processing target gas does not collide directly with the surface of the insulator 500 at the side of the emitter 300. Therefore, it is possible to prevent the source of pollution and moisture vapor contained in the processing target gas from being accumulated, thereby preventing arcing caused by the accumulated source of pollution and moisture vapor.

The insulator 500 of the device for reducing pollutants in indoor air, ambient air, or exhaust gas by using nonthermal plasma according to the present disclosure, which has the reverse emitter, may further include an insulator cleaning means capable of preventing the source of pollution and moisture vapor contained in the processing target gas from being accumulated (501) on the surface of the insulator 500 or of removing the source of pollution and moisture vapor.

In another embodiment of the device for reducing pollutants in indoor air, ambient air, or exhaust gas by using nonthermal plasma according to the present disclosure, the upper and lower ends of the insulator may be made of two or more different electrically insulating materials or the outer and inner portions of the insulator may be made of two or more different electrically insulating materials.

For example, the upper side of the insulator, which is close to the inside of the chamber, may be made of an alumina ceramic material, and the lower side of the insulator, which is close to the horizontal rod, may be made of ceramic glass.

As another example, the center of the insulator may be made of ceramic glass, and an outer sheath may be made of an alumina ceramic material.

FIGS. 11 to 20 are views illustrating various embodiments of insulator cleaning means of the device for reducing pollutants in indoor air, ambient air, or exhaust gas by using nonthermal plasma according to the present disclosure that has the reverse emitter.

Figure 11:
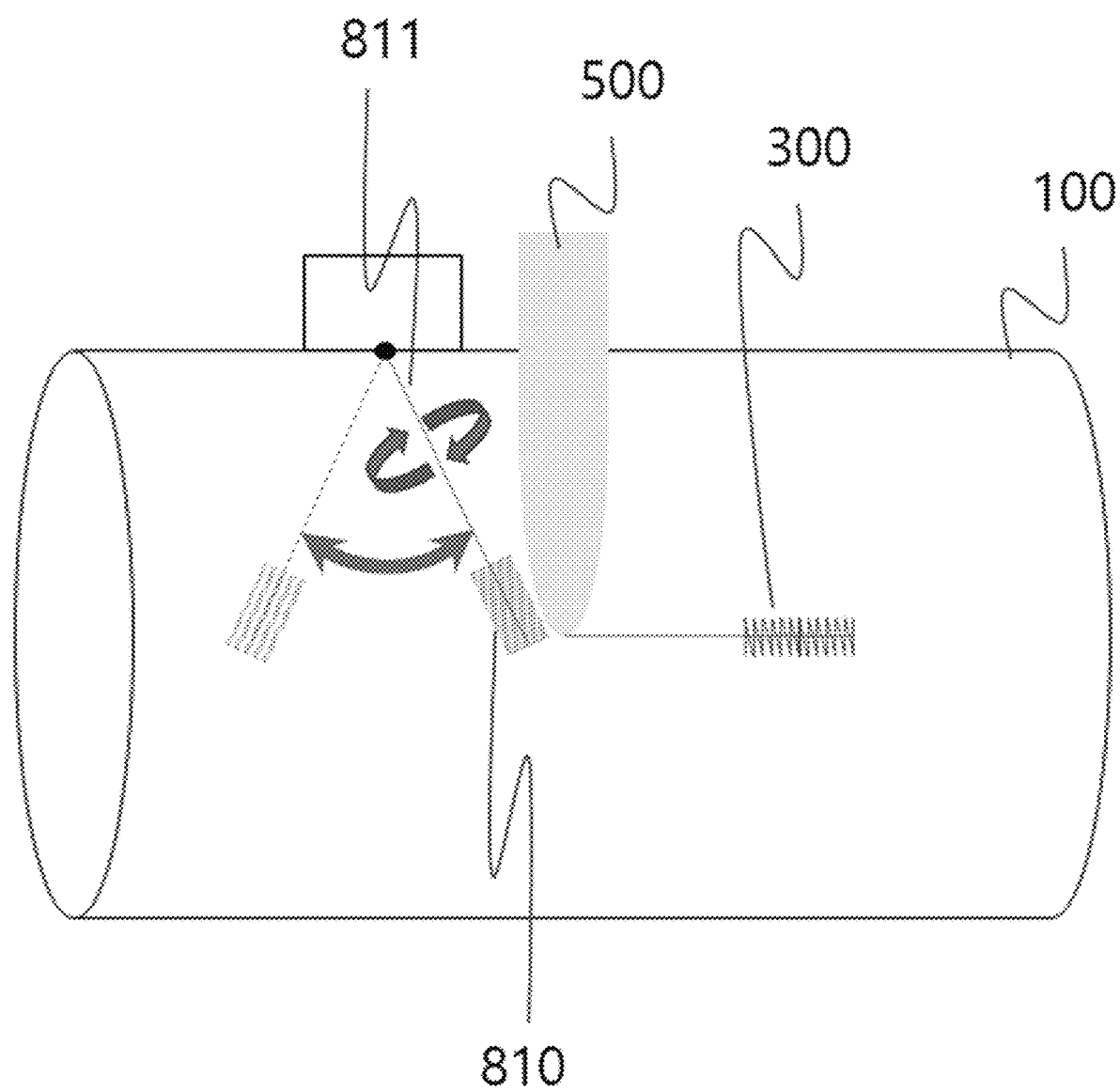
FIGS. 11, 12, 13, 14, 15, 16, 17, 18, 19 and 20 are views illustrating various embodiments of insulator cleaning means of the device for reducing pollutants in indoor air, ambient air, or exhaust gas by using nonthermal plasma according to the present disclosure that has the reverse emitter.

Referring to FIG. 11, in the device for reducing pollutants in indoor air, ambient air, or exhaust gas by using nonthermal plasma according to the present embodiment, the insulator cleaning means is a duster 810 capable of removing the source of pollution and moisture vapor accumulated on the surface of the insulator opposite to the emitter 300.

The duster 810 may be fixed to an end of a rod-shaped support 811.

The support 811 may rotate about the longitudinal direction thereof to make it easy to remove the source of pollution and moisture vapor. In addition, the duster 810 may rotate to move toward or away from the insulator 500.

Figure 12:
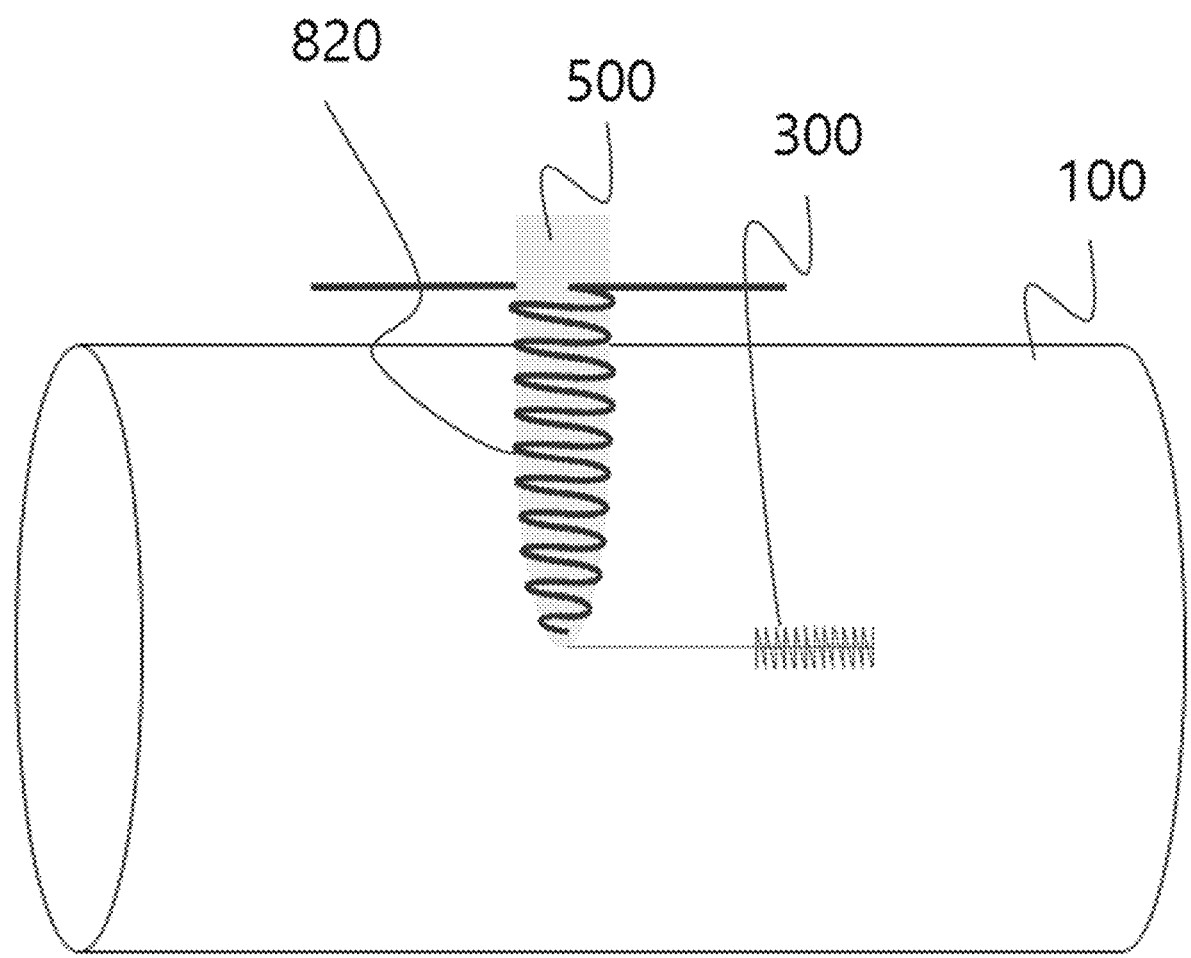
Figure 13:
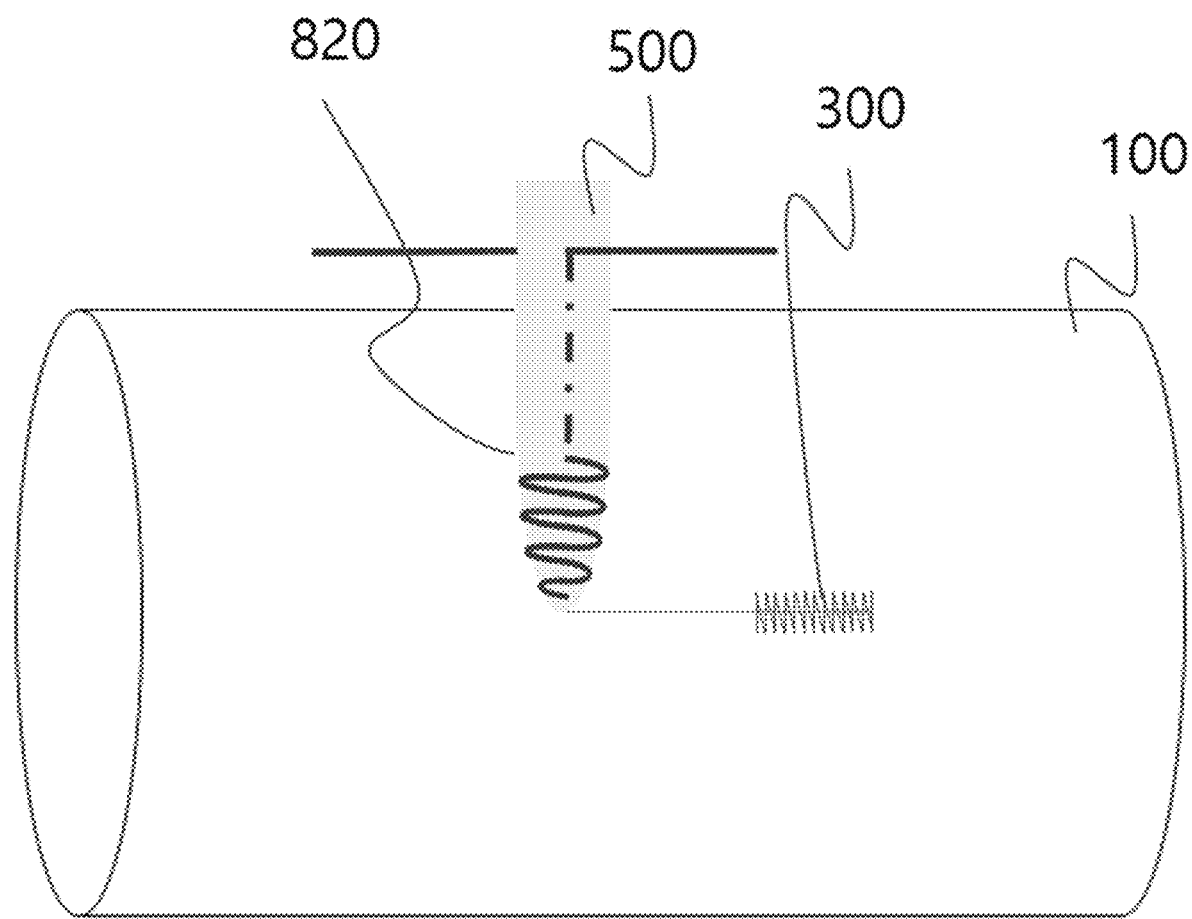

In addition, referring to FIGS. 12 to 13, in the device for reducing pollutants in indoor air, ambient air, or exhaust gas by using nonthermal plasma according to the present embodiment, the insulator cleaning means is an electric heating device 820 capable of maintaining the insulator 500 at a high temperature to burn and remove the source of pollution and moisture vapor accumulated on the surface of the insulator 500.

Particularly, the electric heating device 820 may be a heating device that is a heating wire or element installed and embedded in the insulator 500 or a heating wire or element wound around the surface of the insulator 500.

The electric heating device 820 may heat the entire insulator 500 or heat only a part of the entire insulator 500 disposed adjacent to the horizontal rod.

In addition, referring to FIGS. 14 to 20, in the device for reducing pollutants in indoor air, ambient air, or exhaust gas by using nonthermal plasma according to the present embodiment, the insulator cleaning means is a spray cleaning device.

Figure 14:
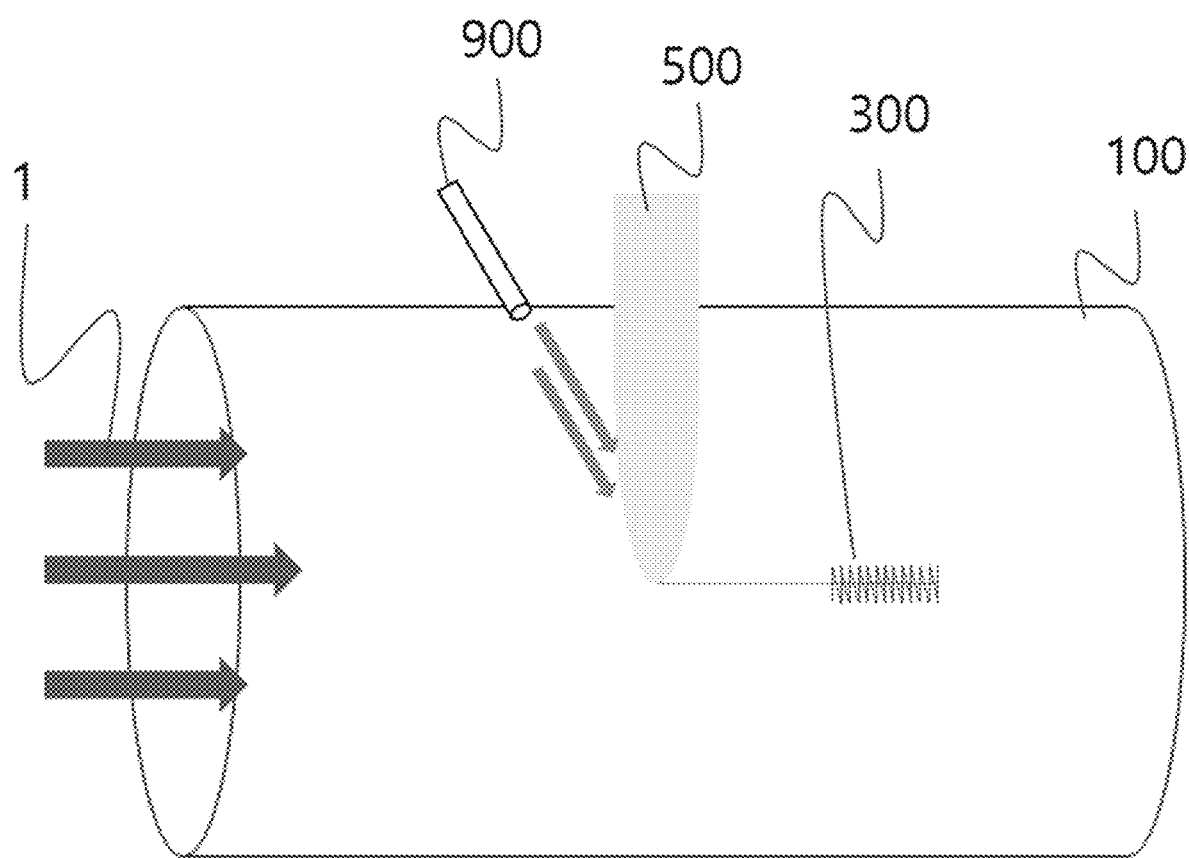
Figure 16:
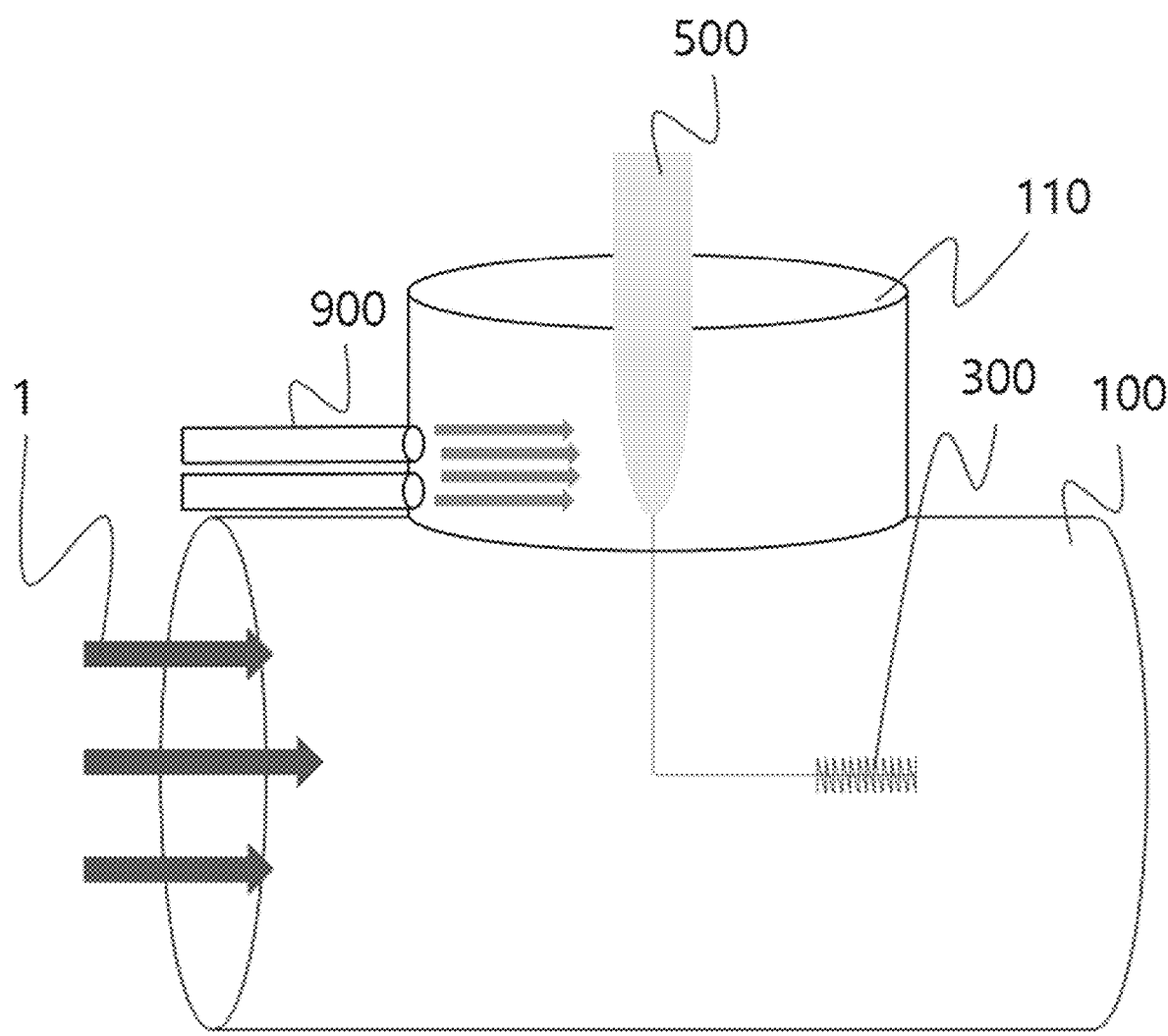
Figure 18:
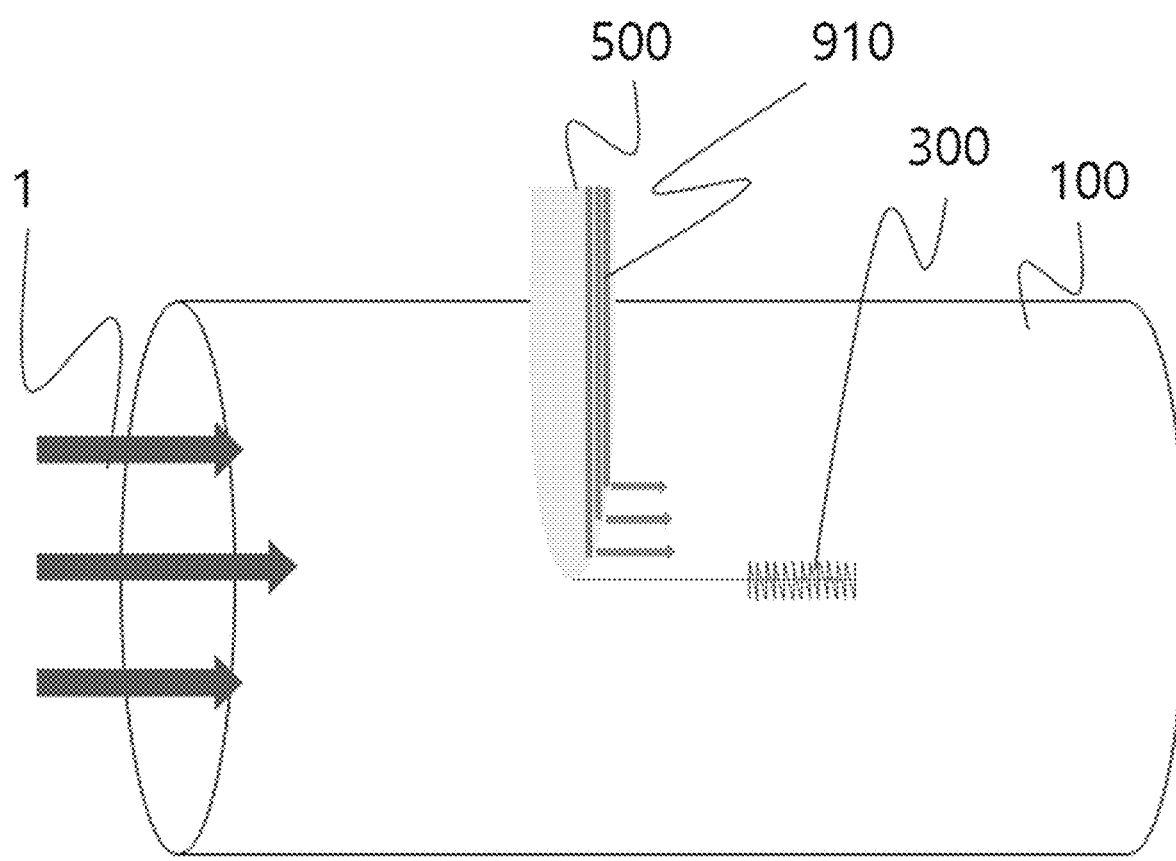

FIGS. 14, 16, and 18 illustrate examples of fuel spray insulator cleaning means.

Figure 15:
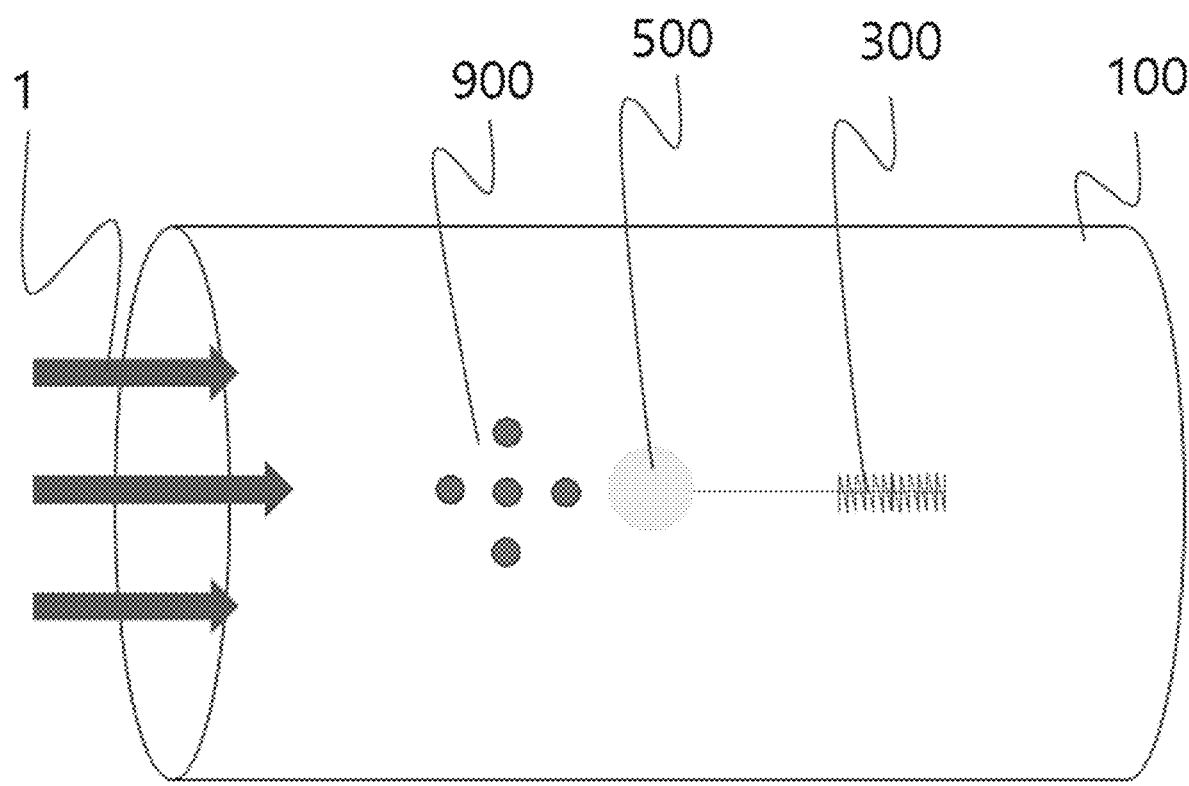
Figure 17:
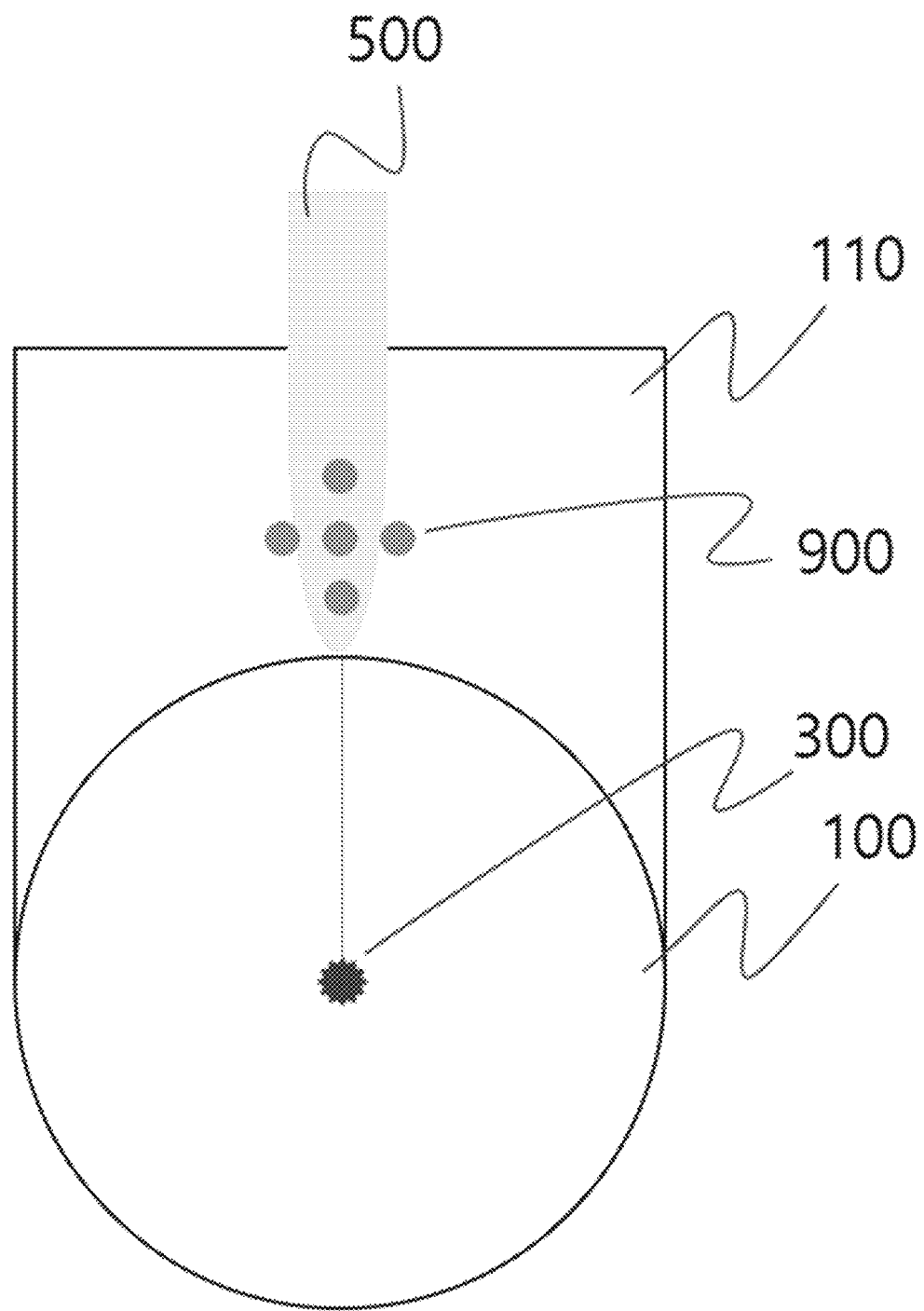

FIG. 15 is a view illustrating the device for reducing pollutants in indoor air, ambient air, or exhaust gas by using nonthermal plasma in FIG. 14 when viewed from above, and FIG. 17 is a view illustrating the device for reducing pollutants in indoor air, ambient air, or exhaust gas by using nonthermal plasma in FIG. 16 when viewed in a direction in which the processing target gas is introduced.

Figure 19:
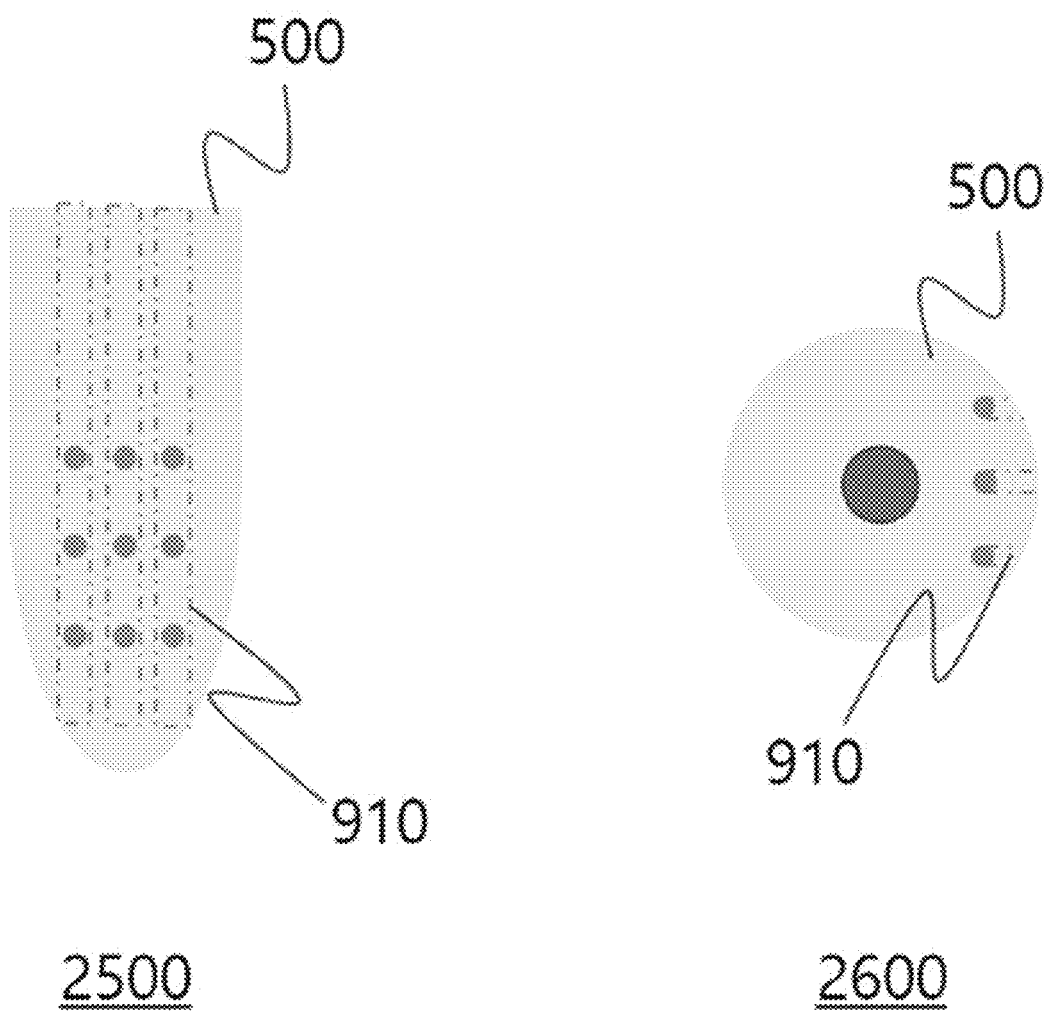

In addition, FIG. 19 is a view 2500 illustrating the device for reducing pollutants in indoor air, ambient air, or exhaust gas by using nonthermal plasma in FIG. 18 when the insulator is viewed in a direction in which the processing target gas is discharged and illustrating a cross-section 2600 in a width direction when viewed from above.

First, referring to FIGS. 14 to 15, the spray cleaning device according to the present embodiment may spray fuel, which at least contains gas, toward a part or the entirety of the front surface portion of the insulator 500 from the outside of the chamber 100 and burn and remove the source of pollution and moisture vapor accumulated on the surface of the insulator 500.

In this case, the spray cleaning device may have an ignition device configured to ignite fuel sprayed to at least any one of the spray cleaning device 900, the chamber 100, and the insulator 500.

The spray cleaning device illustrated in FIGS. 14 to 15 may include tubular bodies having various shapes including thin circular tubes that connect the interior or exterior of the chamber 100. The spray cleaning device may be disposed at the upstream side of the insulator 500 based on the flow direction of the processing target gas.

In addition, referring to FIGS. 16 to 17, the spray cleaning device according to the present embodiment may spray fuel, which contains gas, toward a part or the entirety of the front surface portion of the insulator 500 from the outside of the arcing prevention chamber 110 and burn and remove the source of pollution and moisture vapor accumulated on the surface of the insulator 500.

In this case, the spray cleaning device may have an ignition device configured to ignite fuel sprayed to at least any one of the spray cleaning device 900, the chamber 100, the arcing prevention chamber 110, and the insulator 500.

Next, referring to FIGS. 18 to 19, in the spray cleaning device according to the present embodiment, thin tubes 910 or holes are provided in the insulator 500 to transmit fuel, which contains gas, from one end of the insulator 500 installed outside the chamber 100. The spray cleaning device heats the surface of the insulator 500 by spraying the gas or fuel, thereby burning and removing the pollutants and moisture vapor accumulated on the surface of the insulator 500.

Figure 20:
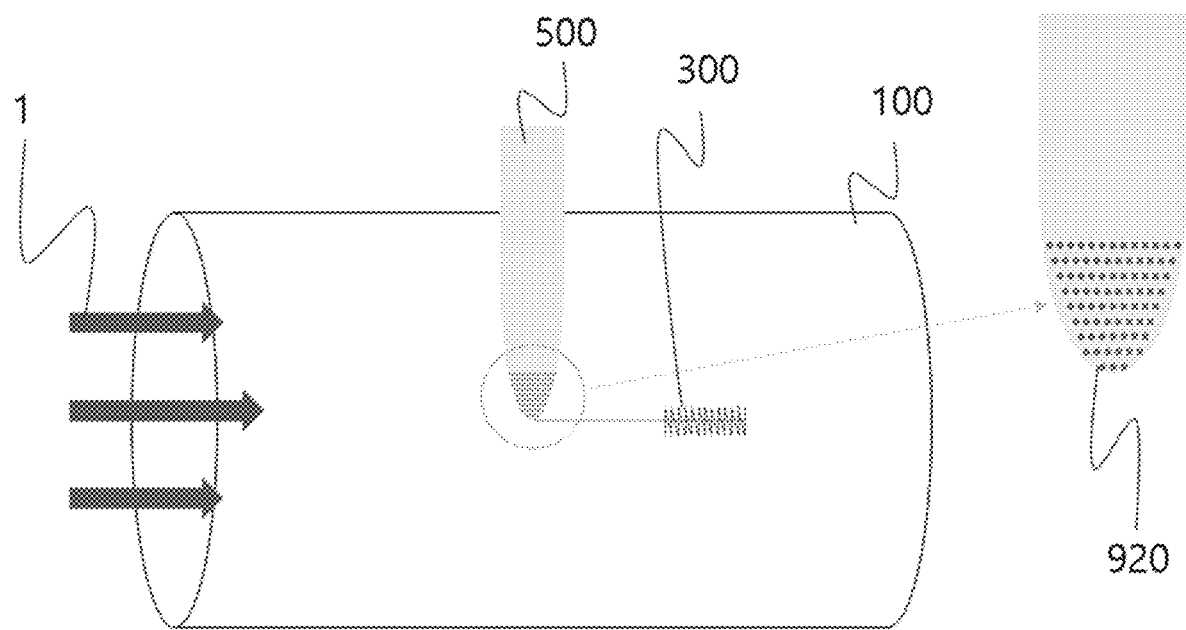

In addition, referring to FIG. 20, the insulator 500 may have its own pores 920 and spray fuel containing gas, thereby burning and removing the pollutants and moisture vapor accumulated on the surface of the insulator.

Figure 21:
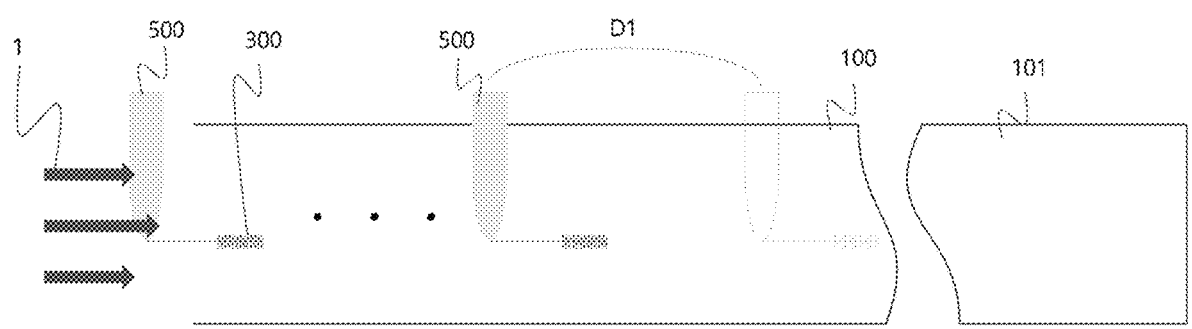
FIGS. 21 and 22 are views illustrating various embodiments of the device for reducing pollutants in indoor air, ambient air, or exhaust gas by using nonthermal plasma in which the reverse emitters in FIG. 10 are sequentially arranged.
Figure 22:
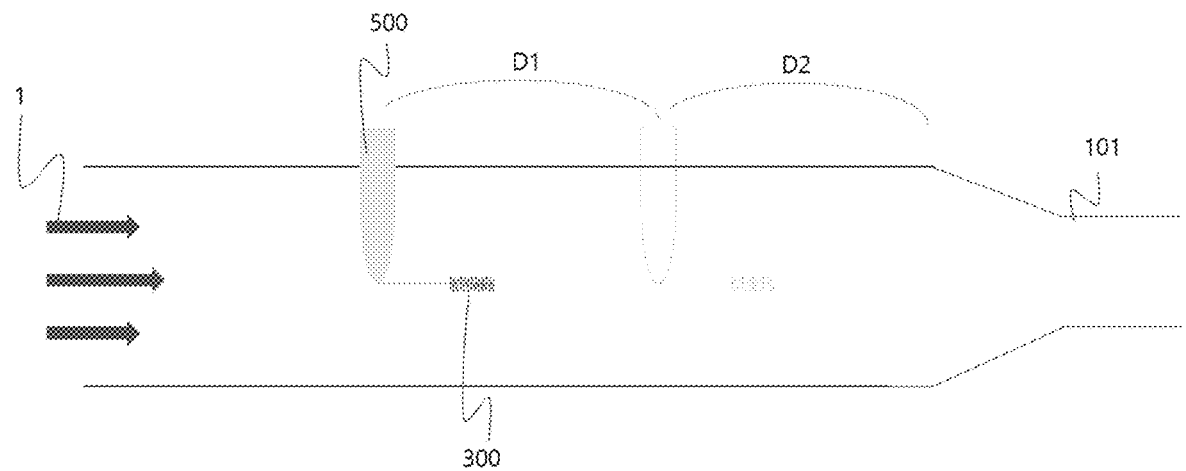

FIGS. 21 and 22 are views illustrating various embodiments of the device for reducing pollutants in indoor air, ambient air, or exhaust gas by using nonthermal plasma in which the reverse emitters in FIG. 10 are sequentially arranged.

Referring to FIGS. 21 and 22, it can be seen that in the device for reducing pollutants in indoor air, ambient air, or exhaust gas by using nonthermal plasma according to the present embodiment, the reverse emitters are sequentially arranged.

Because the configuration, illustrated in FIGS. 21 and 22, in which the reverse emitters are sequentially arranged is identical to the configuration in which the plurality of emitters illustrated in FIG. 5 is sequentially arranged, a description thereof will be omitted.

In addition, in case that back pressure is generated as the chamber 101, which is connected to the rear sides of the plurality of insulators 500 disposed in a row in the direction 1 of the processing target gas as illustrated in FIGS. 21 and 22, is narrowed or curved, the rear spacing distances D1 and D2, which are distances in which at least one insulator or one or more insulators may be installed at the rear side of the endmost insulator, needs to be ensured and connected to the chamber 101 to prevent the vortex or reverse flow of the processing target gas, prevent the source of pollution in the processing target gas from being accumulated on the insulator because of the vortex or reverse flow of the processing target gas, and prevent arcing caused by the accumulated source of pollution.

In this case, the distance, in which one insulator 500 or one or more insulators 500 may be installed, is the distance between the two adjacent insulators among the plurality of insulators 500 disposed in a row.

In addition, referring to FIG. 22, when the chamber 101 connected to the rear sides of the plurality of insulators 500 disposed in a row is narrowed or curved, the rear spacing distance increases as a degree to which the chamber is narrowed or an angle at which the chamber is curved increases.

That is, when a degree to which the shape of the chamber 101 connected to the rear sides of the plurality of insulators disposed in a row is different from the shape of the chamber in which the plurality of insulators is arranged is high, the rear spacing distance may be increased, such that the vortex or reverse flow of the processing target gas may be prevented, the source of pollution in the processing target gas may be prevented from being accumulated on the insulator, and the space may be ensured to the extent of the rear spacing distance.

In FIG. 21, the rear spacing distance D1 is set as the distance in which one insulator 500 may be installed.

In contrast, FIG. 22 illustrates that a width of the chamber 101 connected to the rear side of the insulator becomes greatly smaller than the width of the chamber 100, such that the rear spacing distance becomes (D1+D2), and the rear spacing distance D1 may be set as the distance in which two insulators 500 may be installed.

Figure 23:
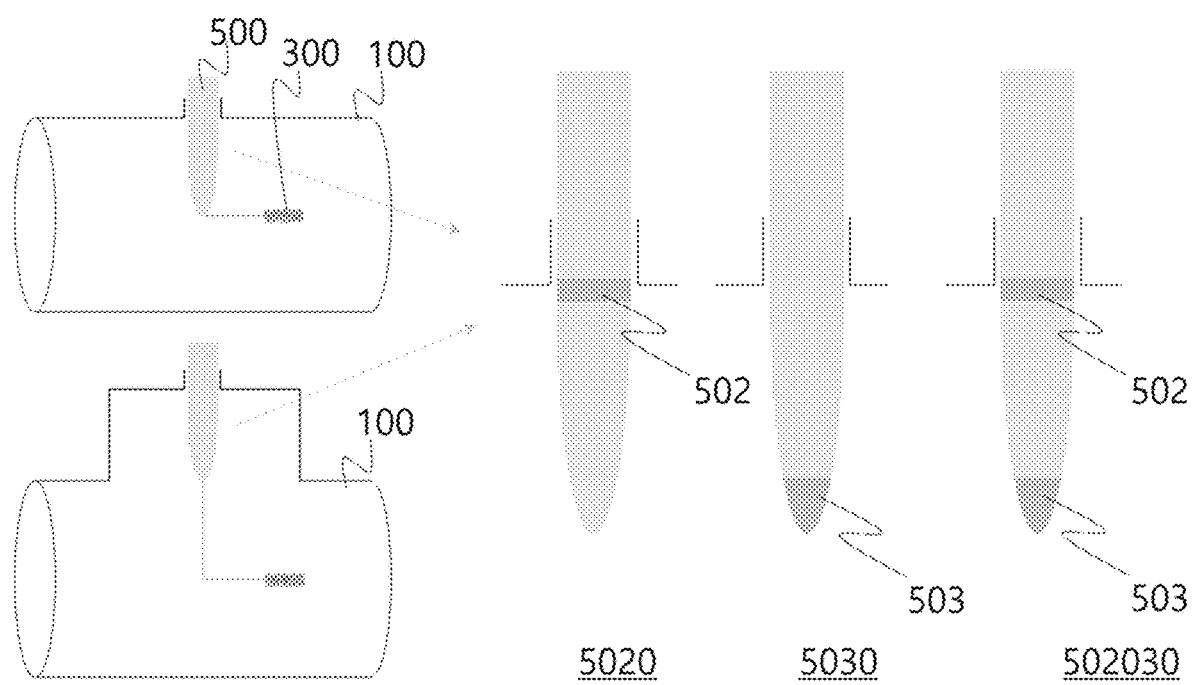
FIG. 23 is a view illustrating the embodiment of the device for reducing pollutants in indoor air, ambient air, or exhaust gas by using nonthermal plasma according to the present disclosure that has an emitter upper-end outer sheath and an emitter lower-end outer sheath.

FIG. 23 is a view illustrating the embodiment of the device for reducing pollutants in indoor air, ambient air, or exhaust gas by using nonthermal plasma according to the present disclosure that has an insulator upper-end outer sheath and an insulator lower-end outer sheath.

Referring to FIG. 23, the device for reducing pollutants in indoor air, ambient air, or exhaust gas by using nonthermal plasma according to the present embodiment may further include at least any one of an upper-end outer sheath 502 and a lower-end outer sheath 503 that surround the outer surface of the insulator 500.

The upper-end outer sheath 502 is made of a metal conductor containing stainless steel and copper. The upper-end outer sheath 502 has a length equal to or smaller than a preset height H from one side of the inner surface of the chamber and surrounds the outer surface of the insulator.

The lower-end outer sheath 503 is made by a metal conductor containing stainless steel and copper. The lower-end outer sheath 503 has a length equal to or smaller than a preset height H from the position of the horizontal rod and surrounds the outer surface of the insulator.

Particularly, the upper-end outer sheath 502 includes an insulator upper-end outer sheath 502 configured to surround, at a predetermined height, the periphery of the surface of the insulator 500 at the portion where the chamber 100 and the insulator 500 are fastened, and the insulator upper-end outer sheath 502 is spaced apart from the inner surface of the chamber 100.

In case that only one of the insulator upper-end outer sheath and the lower-end outer sheath is installed, a height thereof particularly needs to be smaller than ½ of the vertical height h of the emitter. Alternatively, in case that both the insulator upper-end outer sheath and the lower-end outer sheath are simultaneously installed, a sum of heights of the sheaths particularly needs to be smaller than ½ of the vertical height h of the emitter.

In case that the above-mentioned structure is adopted, the insulator upper-end outer sheath 502 and the insulator lower-end outer sheath may easily induce arcing, which makes it possible to prevent the source of pollution and moisture vapor contained in the processing target gas from being accumulated on the surface of the insulator 500.

The upper-end outer sheath 502 and the lower-end outer sheath 503 are arcing generation structures that intentionally and frequently generate small-scale arcing.

Arcing occurs when pollutants and moisture vapor accumulated on the surface of the insulator. In case that arcing occurs in a state in which a large amount of pollutants and moisture vapor are accumulated, a great loss of voltage occurs to the extent that a voltage drop occur in the entire system.

The upper-end outer sheath 502 and the lower-end outer sheath 503 induce small-scale arcing accompanied by a small voltage drop from arcing that occurs because of pollutants and moisture vapor accumulated on the surface of the insulator.

Only one (5020, 5030) of or both (502030) the upper-end outer sheath 502 and the lower-end outer sheath 503 may be installed. Only the upper-end outer sheath 502 may be installed (5020).

Figure 24:
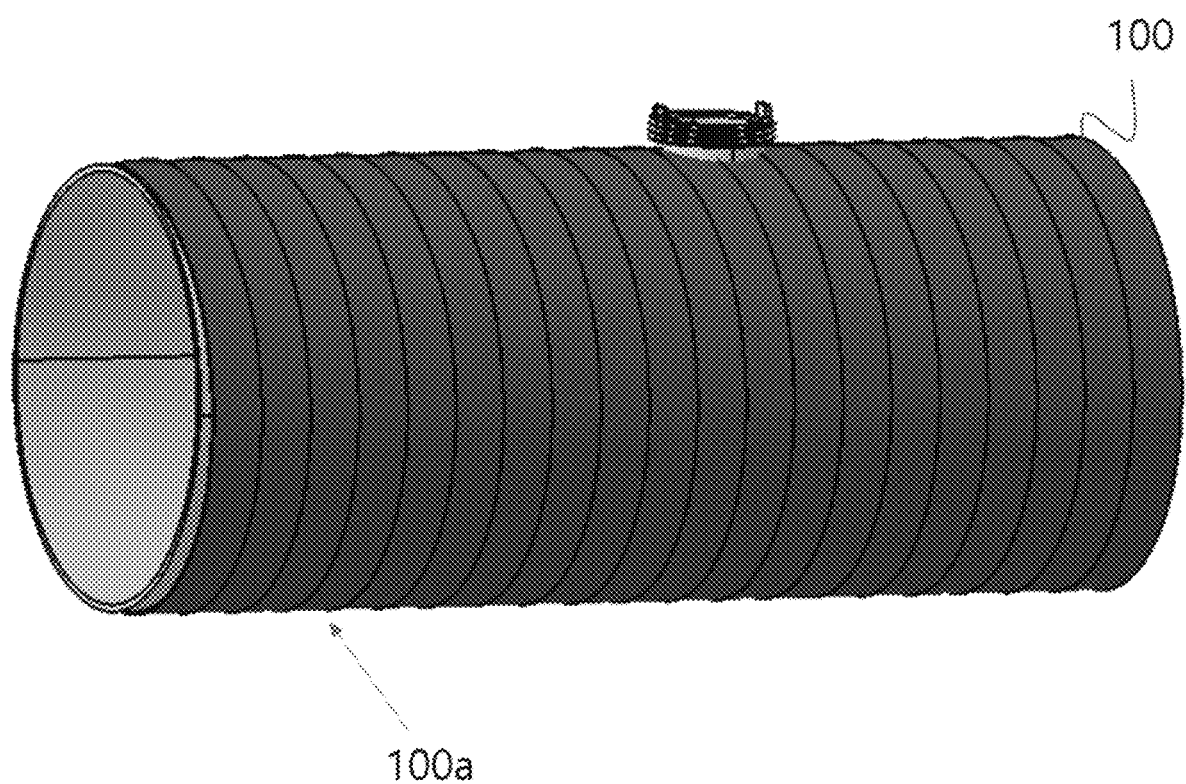
FIG. 24 is a view illustrating the embodiment of the device for reducing pollutants in indoor air, ambient air, or exhaust gas by using nonthermal plasma according to the present disclosure that has a moisture vapor removing means.

FIG. 24 is a view illustrating the embodiment of the device for reducing pollutants in indoor air, ambient air, or exhaust gas by using nonthermal plasma according to the present disclosure that has a moisture vapor removing means in the chamber 100.

Referring to FIG. 24, a device capable of surrounding the outer surface of the chamber 100 with the heating insulator 100a and heating the heating insulator is provided, and the device heats the chamber by operating before an engine operates or when the engine initially operates.

The chamber is heated, and an appropriate temperature is maintained, which makes it possible to prevent unnecessary arcing caused by internal condensation of the moisture vapor that occurs when the engine initially operates.

In this case, an example of a heat generation device heats the heating insulator 100a by applying electric current.

Figure 25:
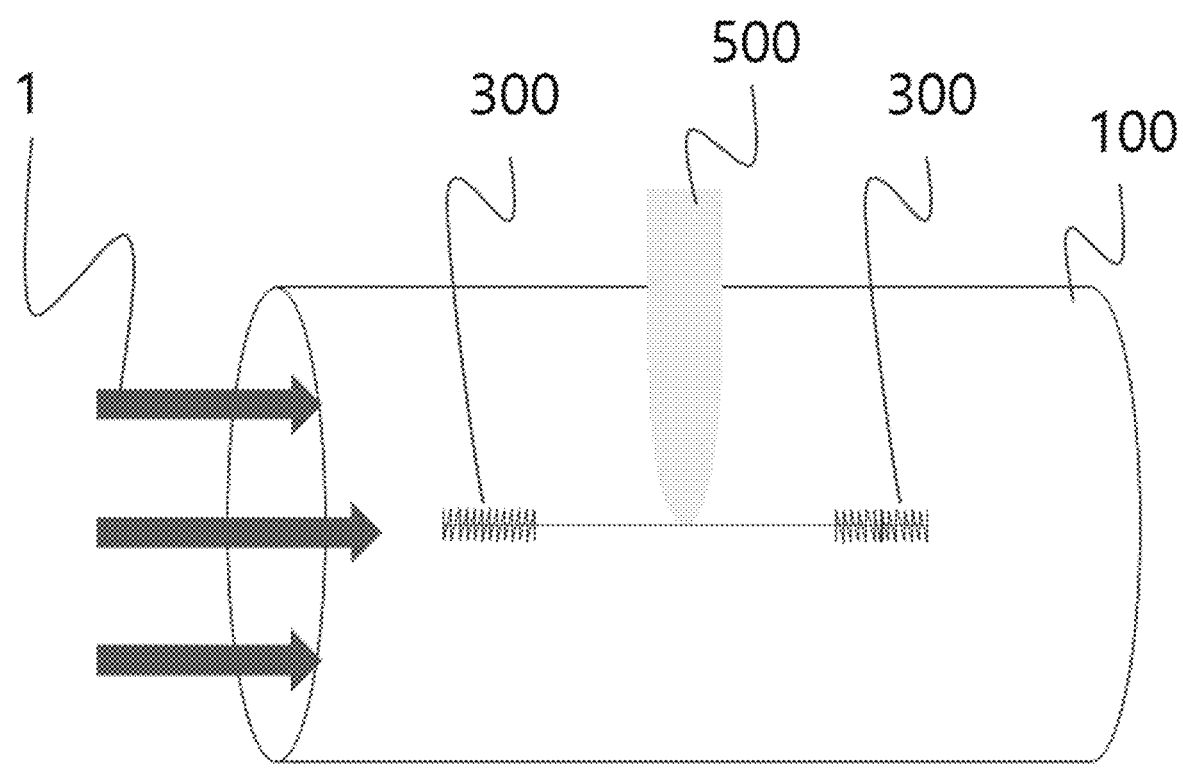
FIG. 25 is a view illustrating the embodiment of the device for reducing pollutants in indoor air, ambient air, or exhaust gas by using nonthermal plasma according to the present disclosure that has a bidirectional emitter.

FIG. 25 is a view illustrating the embodiment of the device for reducing pollutants in indoor air, ambient air, or exhaust gas by using nonthermal plasma according to the present disclosure that has a bidirectional emitter.

Referring to FIG. 25, in the device for reducing pollutants in indoor air, ambient air, or exhaust gas by using nonthermal plasma according to the present embodiment, the emitters 300 may be provided at front and rear sides of the vertical rod based on the flow direction of the processing target gas.

Because the two emitters 300 installed on the single insulator generate plasma, only the pollutants and moisture vapor accumulated on the surface of the single insulator may be removed. Therefore, it is possible to effectively remove the source of pollution in the processing target gas even though the single power supply device, which supplies power lower than a sum of power provided from the two power supply devices, is provided.

Figure 26:
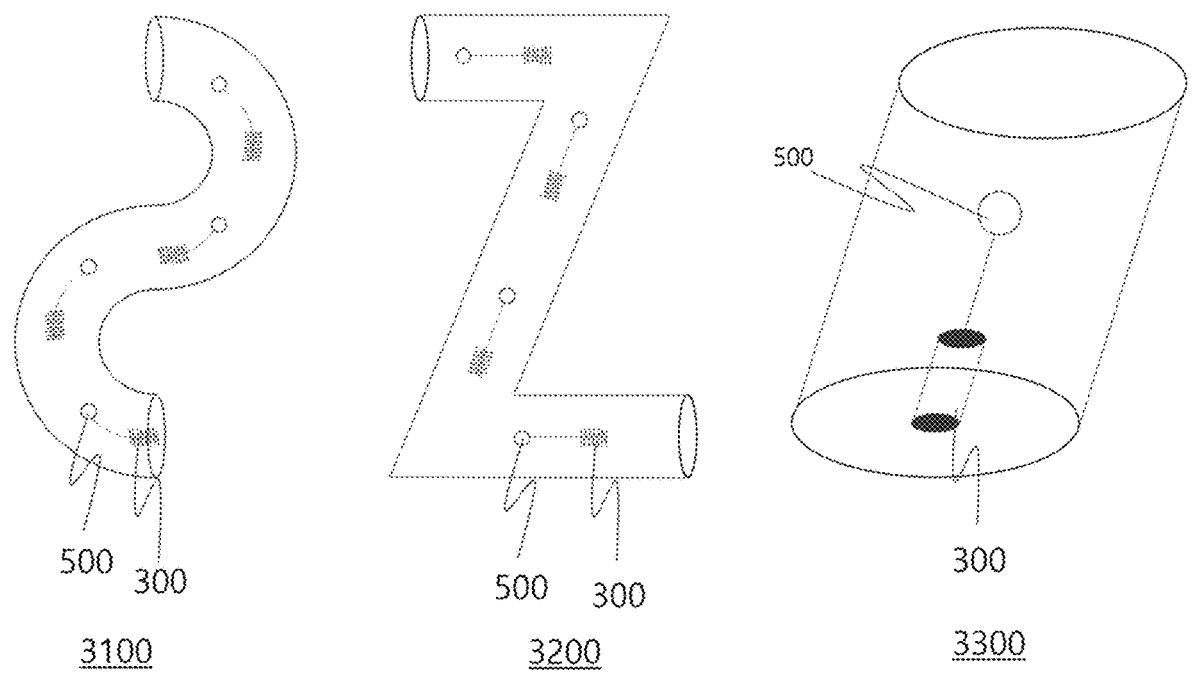
FIG. 26 is a view illustrating various embodiments of the device for reducing pollutants in indoor air, ambient air, or exhaust gas by using nonthermal plasma according to the present disclosure that has various chambers.

FIG. 26 is a view illustrating various embodiments of the device for reducing pollutants in indoor air, ambient air, or exhaust gas by using nonthermal plasma according to the present disclosure that has various chambers.

Referring to FIG. 26, in the device for reducing pollutants in indoor air, ambient air, or exhaust gas by using nonthermal plasma according to the present embodiment, the chamber 100 is configured as a tubular body made by a straight tubular body, a curved tubular body, or a combination thereof. In this case, the center of the emitter 300 is always positioned at the center of the chamber 100.

In FIG. 26, the chamber may be a curved tubular body 3100, composite straight tubular body 3200 having different directions, or a straight tubular body 3300 having the longitudinal direction and the cross-section direction that are not perpendicular to each other.

In still another embodiment, the device for reducing pollutants in indoor air, ambient air, or exhaust gas by using nonthermal plasma according to the present disclosure may further include a reverse power applying device.

When the reverse power applying device supplies direct current to the power supply device, the reverse power applying device supplies power to the emitter while instantaneously changing polarities of the (+) pole and the (−) pole of the power supply device in an appropriate cycle.

Despite the flow of the processing target gas, a significant amount of pollutants, which are ionized in the chamber 100, may be adsorbed because of the (+) or (−) polarity.

However, the adsorbed pollutants are detached unexpectedly when the flow rate of the processing target gas increases, which may cause arcing at the periphery of the insulator 500. Therefore, it is necessary to detach the ionized pollutants before a large amount of pollutants are adsorbed.

The device for reducing pollutants in indoor air, ambient air, or exhaust gas by using nonthermal plasma, which has the reverse power applying device, frequently detaches the pollutants adsorbed in the chamber 100 and smoothly discharges the pollutants, thereby preventing excessively intense arcing and preventing deterioration in efficiency in generating plasma.

FIGS. 27 to 33 is a view illustrating the embodiment of the device for reducing pollutants in indoor air, ambient air, or exhaust gas by using nonthermal plasma according to the present disclosure in which an interior of the chamber is divided.

Referring to FIGS. 27 to 33, in still yet another embodiment, the device for reducing pollutants in indoor air, ambient air, or exhaust gas by using nonthermal plasma according to the present disclosure has a bundle of unit chambers disposed on a processing target gas flow path of the chamber and configured to divide the entire vertical cross-section into a plurality of cross-sections in the flow direction of the processing target gas.

Particularly, the plurality of unit chambers, which constitutes the bundle of unit chambers, has cross-sections having the same shape, and the emitter is provided at a center of the interior of each of the plurality of unit chambers.

An outer surface of the emitter is similar in shape to an inner surface of the unit chamber. The emitter is always positioned at a predetermined position within a shortest distance from any position on the outer surface of the emitter to the inner surface of the unit chamber.

Figure 27:
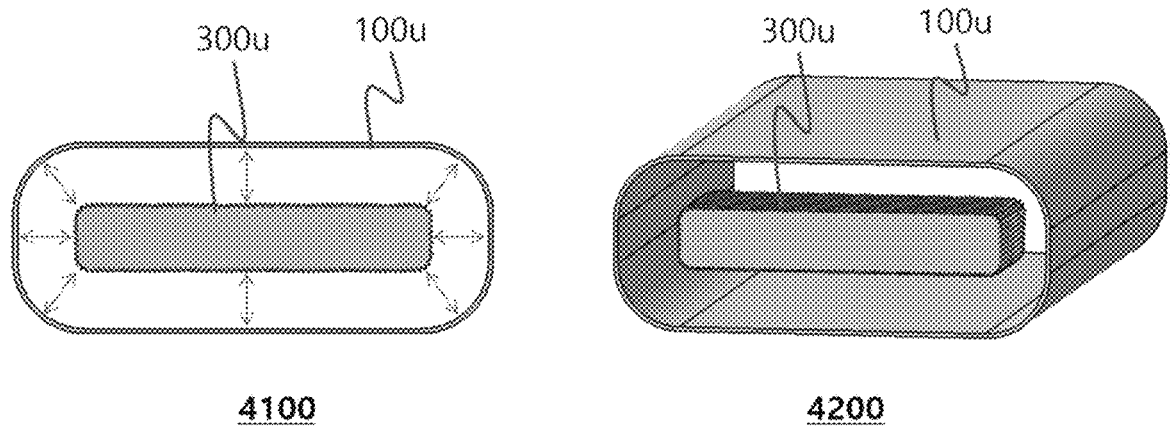
Figure 28:
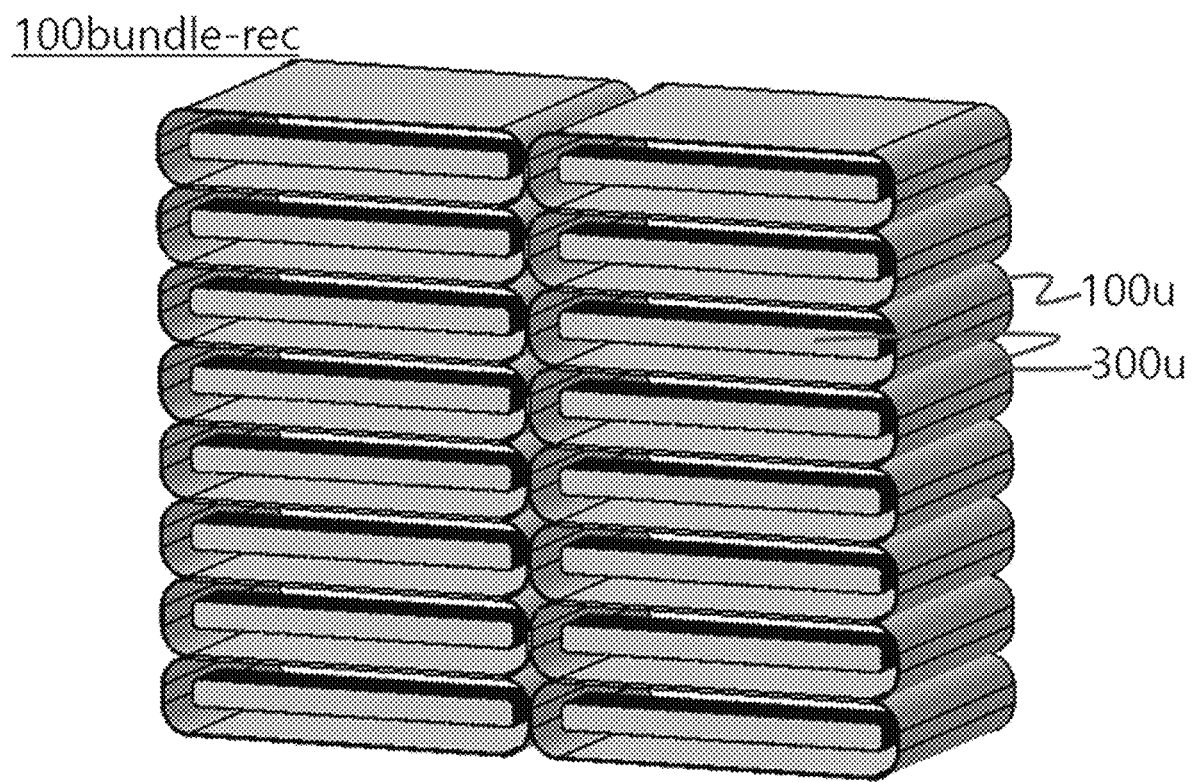
Figure 29:
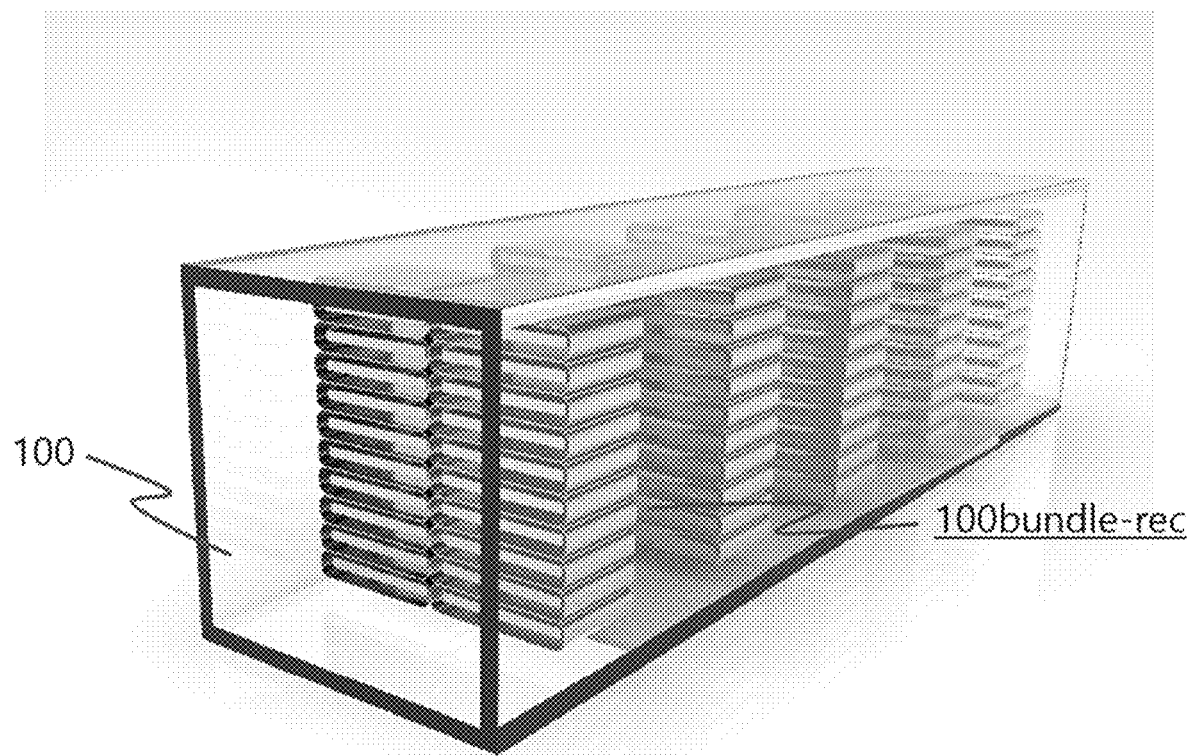

FIGS. 27 to 29 illustrate the chamber 100 has therein a unit chamber 100u in which an emitter 300u having a cross-sectional shape, which is a rounded edge quadrangular shape, is disposed, and the bundle of unit chambers (100bundle-rec) and the bundle of unit chambers (100bundle-rec) using the unit chambers 100u.

First, FIG. 27 illustrates a cross-sectional view 4100 and a perspective view 4200 illustrating the emitter 300u having a cross-sectional shape, which is a rounded edge quadrangular shape, and the chamber 100u.

FIG. 28 illustrates the bundle of unit chambers (100bundle-rec) in which the plurality of chambers 100u in FIG. 27 is disposed side by side. In this case, each of the chambers is the unit chamber.

FIG. 29 illustrates that the bundle of unit chambers (100bundle-rec) in FIG. 28 is disposed in another large-scale chamber 100.

As illustrated in FIG. 29, a plurality of bundles of unit chambers (100bundle-rec) may be disposed in the flow direction of the processing target gas.

Figure 30:
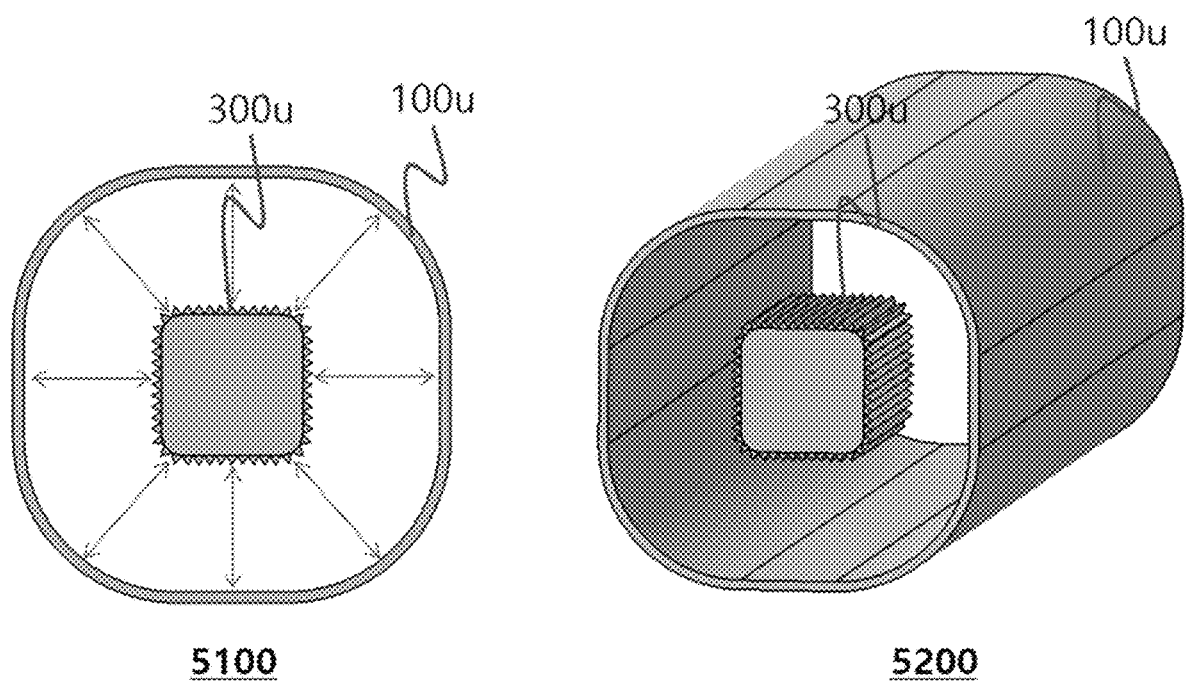
Figure 31:
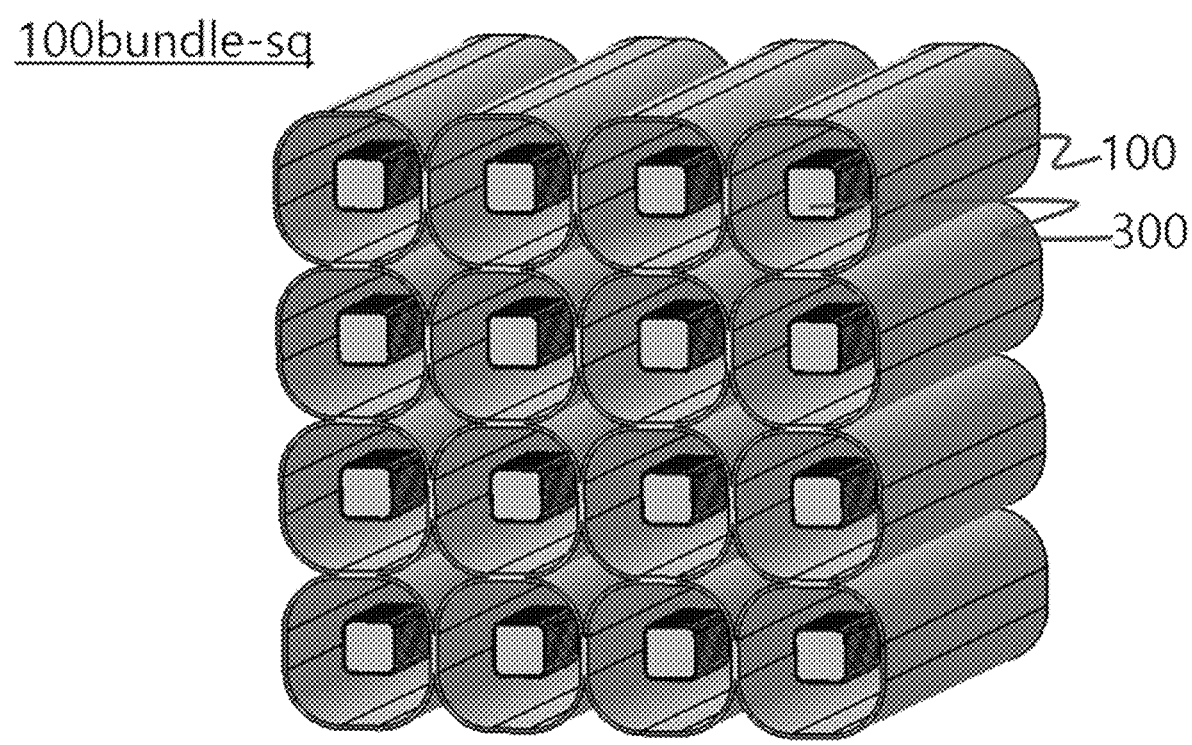

FIG. 30 illustrates a cross-sectional view 5100 and a perspective view 5200 illustrating a chamber having a cross-section having a rounded edge square shape, and FIG. 31 is a view illustrating a bundle of unit chambers (100bundle-sq) having a rounded edge square shape.

Figure 33:
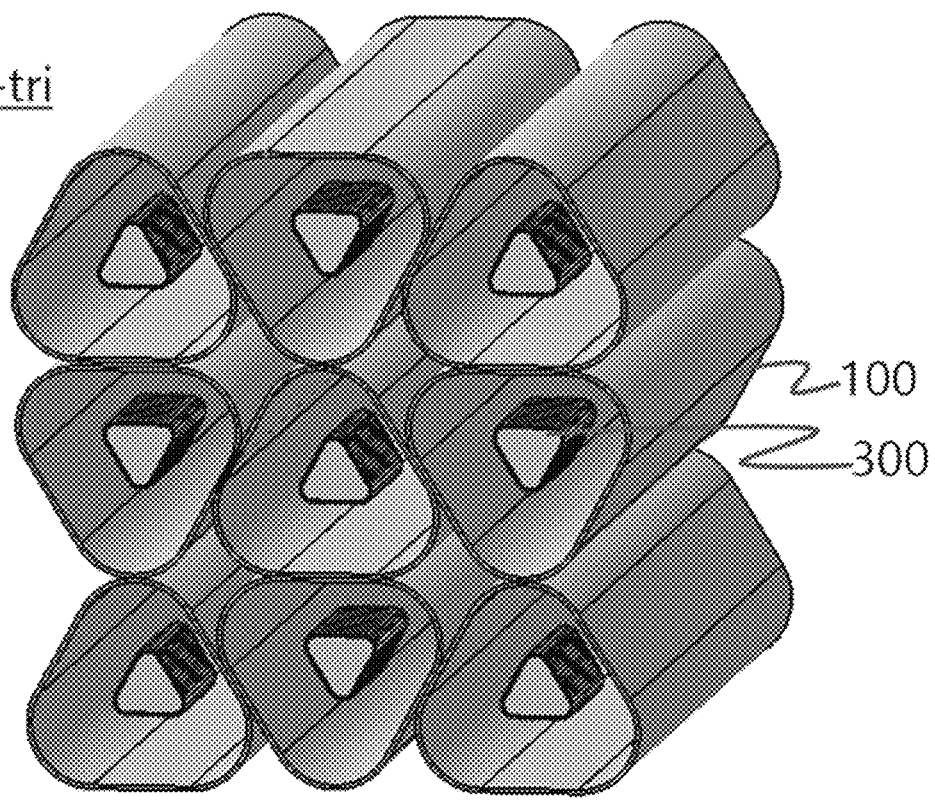

FIG. 32 illustrates a cross-sectional view 6100 and a perspective view 6200 illustrating a chamber having a cross-section having a rounded edge triangular shape, and FIG. 33 is a view illustrating a bundle of unit chambers (100bundle-tri) having a rounded edge triangular shape.

The bundle of unit chambers may be inserted into the portion where the chamber, through which the processing target gas configured as indoor air, ambient air, or exhaust gas including pollutants passes, is cut by a predetermined length, and two opposite ends of the bundle of unit chambers may be connected to a cut surface of the chamber.

In addition, in case that like a stack (exhaust gas passageway) of an LNG power station, the chamber, through which the processing target gas passes, is a nonconductor through which electricity cannot flows, the bundle of unit chambers may be inserted into the chamber. In this case, the insulator need not be essentially provided because the chamber is a nonconductor.

Figure 34:
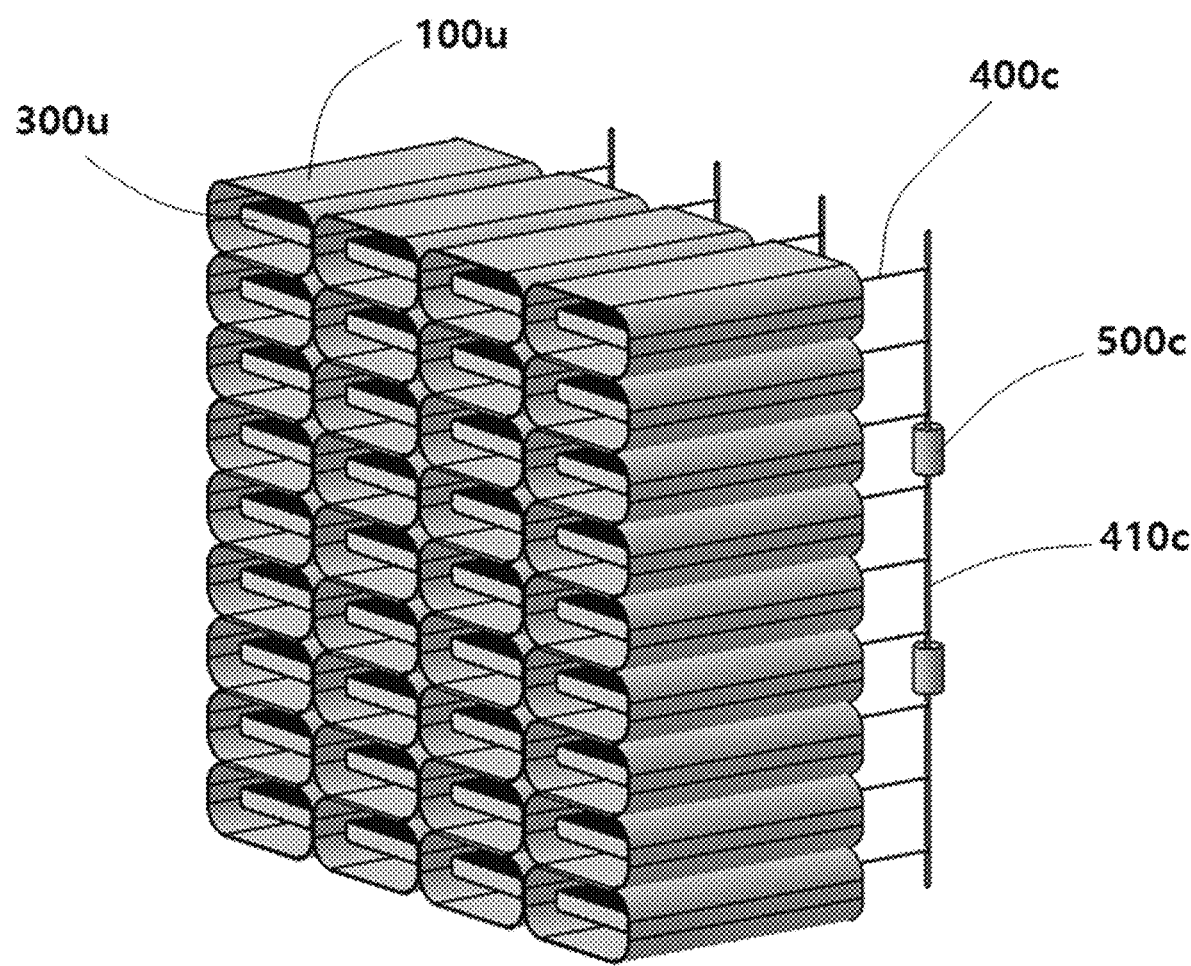
Figure 35:
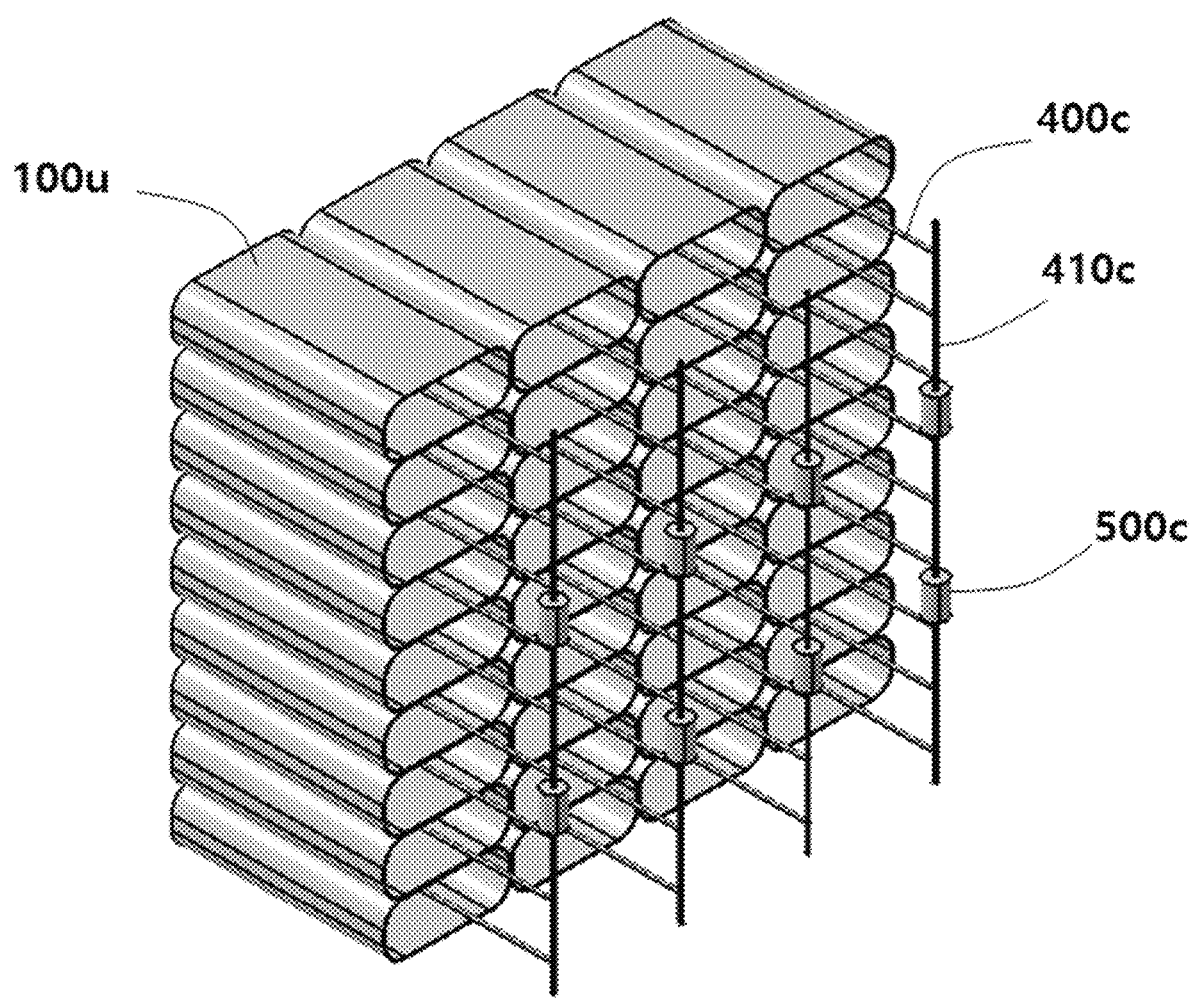

In addition, referring to FIGS. 34 to 35, connection horizontal rods 400c may be sufficiently elongated from the bundle of unit chambers, such that a spacing distance of high-voltage electric current from the bundle of unit chambers may be ensured. Connection vertical rods 410c may connect the plurality of connection horizontal rods 400c, thereby supplying power to the plurality of emitters through a single electric wire.

In this case, the plurality of connected connection horizontal rod 400c and the connection vertical rods 410c may connect the unit emitters 300u in the single bundle of unit chambers or connect the unit emitters in the plurality of bundles of unit chambers. The plurality of connection vertical rods 410c may be disposed straight between the upper and lower ends of the chamber by connection insulators 500c disposed between the connection vertical rods 410c. The connection vertical rods 410c, which are fastened in the upward/downward direction by the connection insulators 500c, are separated from one another.

The plurality of bundles of unit chambers includes several tens to hundreds of unit chambers. Therefore, it is possible to minimize an influence on the efficiency in generating the entire plasma even though arcing occurs in one or more unit chambers, which makes it possible to prevent deterioration in efficiency in generating the entire nonthermal plasma.

In the device for reducing pollutants in indoor air, ambient air, or exhaust gas by using nonthermal plasma according to the present embodiment, the plurality of unit chambers, i.e., the bundle of unit chambers, which is isolated from one another, is disposed in the chamber, such that the unit chamber, in which arcing occurs, is separated from the unit chamber in which plasma occurs and the pollutants are reduced.

Therefore, the function of reducing pollutants may be continuously performed even though arcing is generated in some of the unit chambers.

Figure 36:
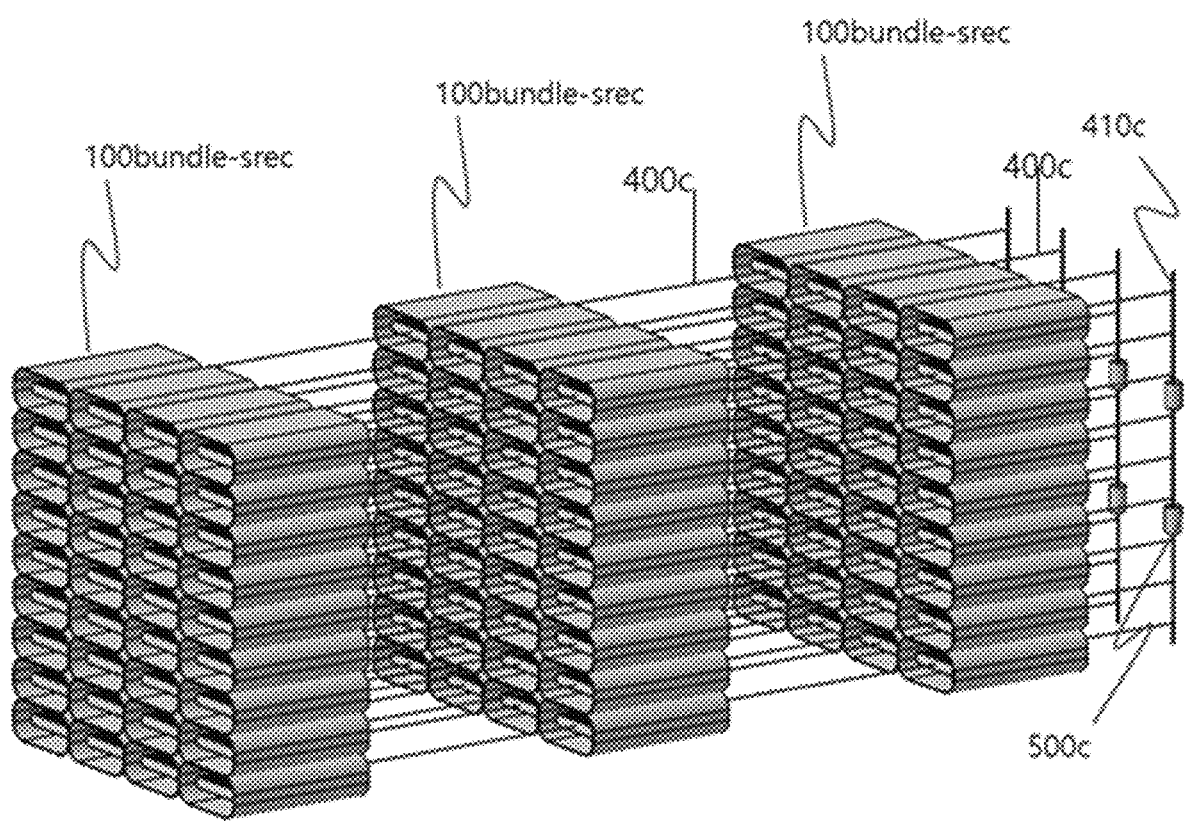

FIG. 36 illustrates that a plurality of bundles of unit chambers (100bundle-rec) is disposed in the longitudinal direction of the chamber.

Referring to FIG. 36, the plurality of bundles of unit chambers (100bundle-rec) may be disposed in the flow direction of the processing target gas.

Figure 37:
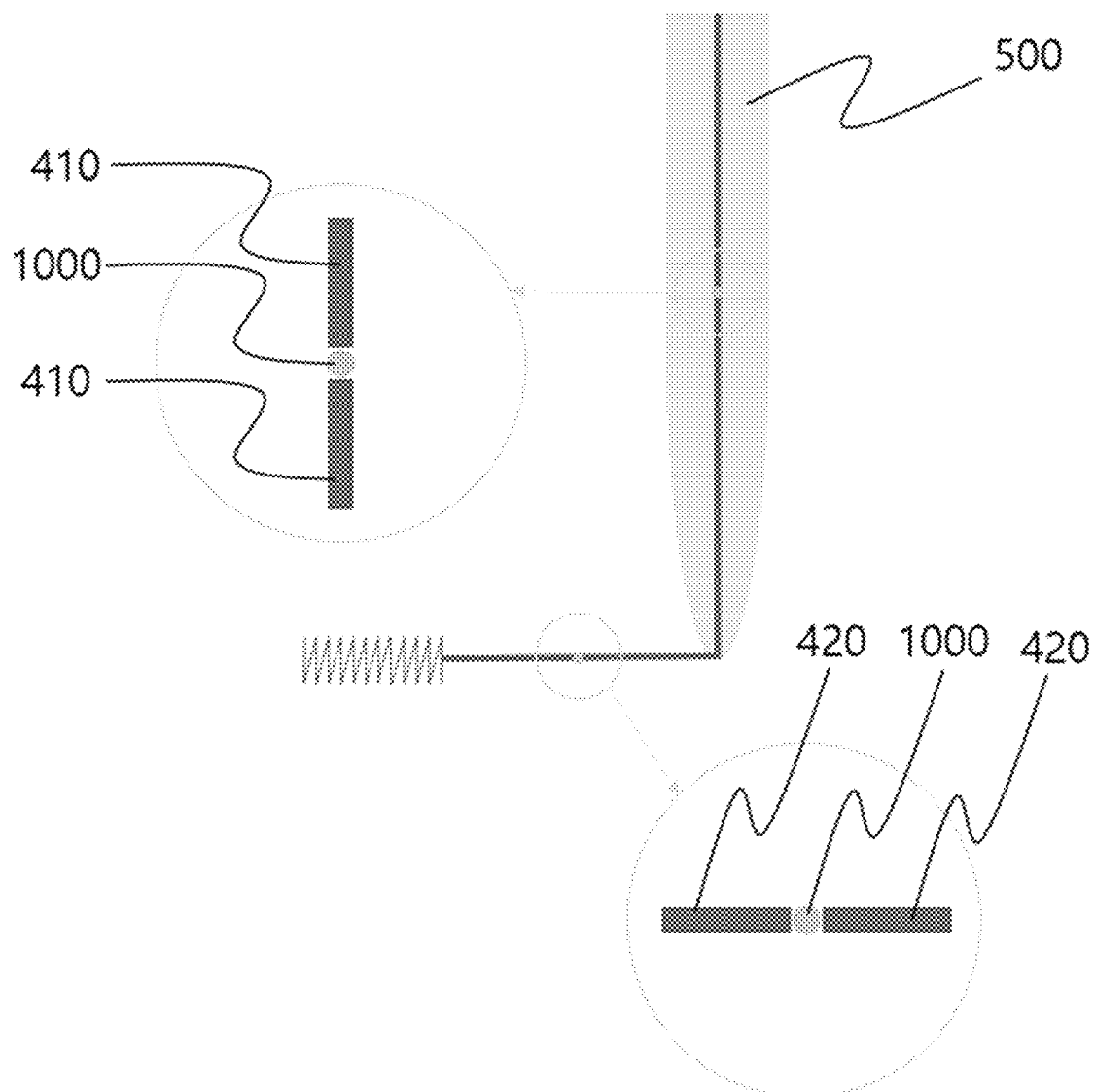
FIGS. 37, 38 and 39 are views for explaining insulation members.
Figure 38:
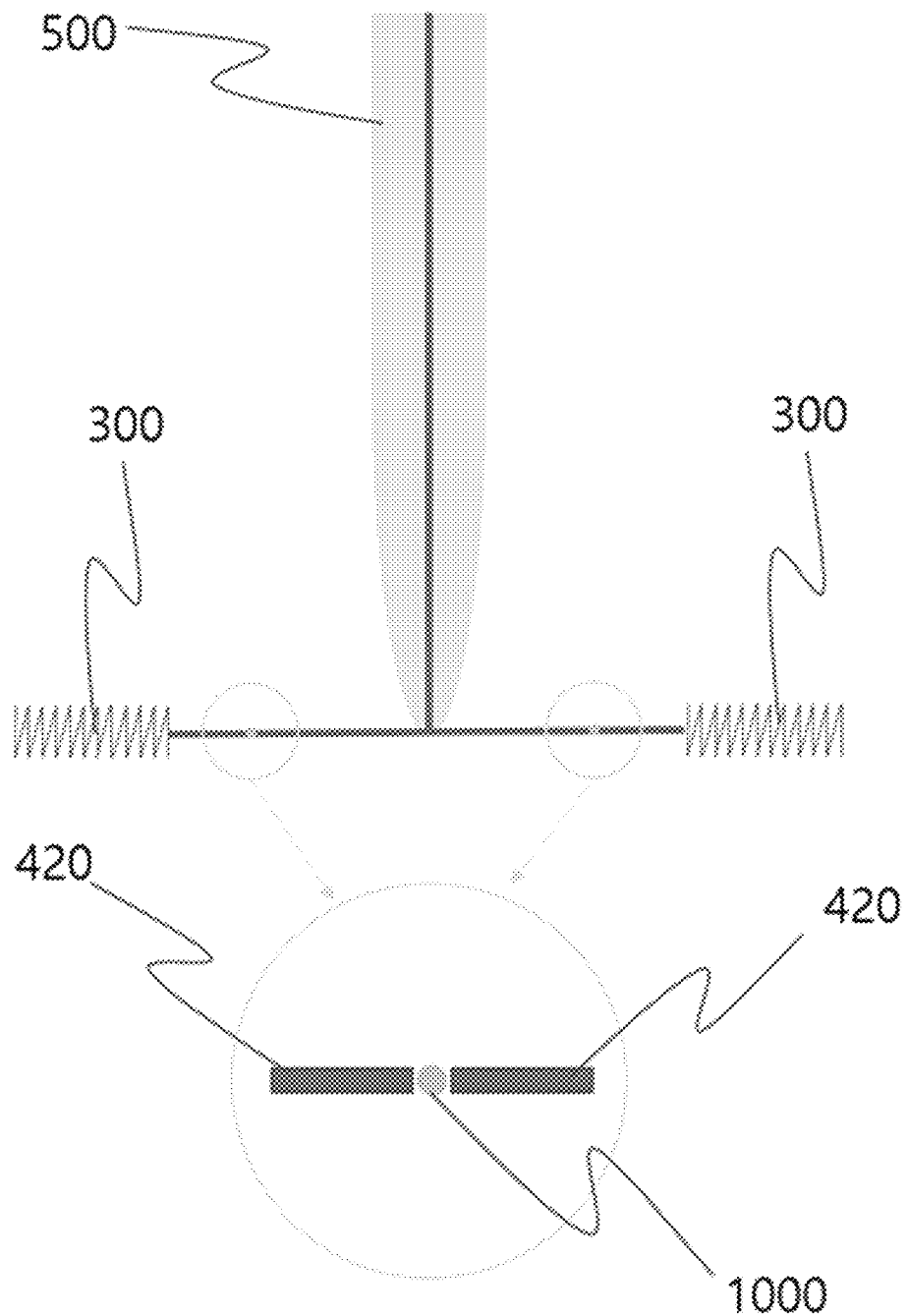
Figure 39:
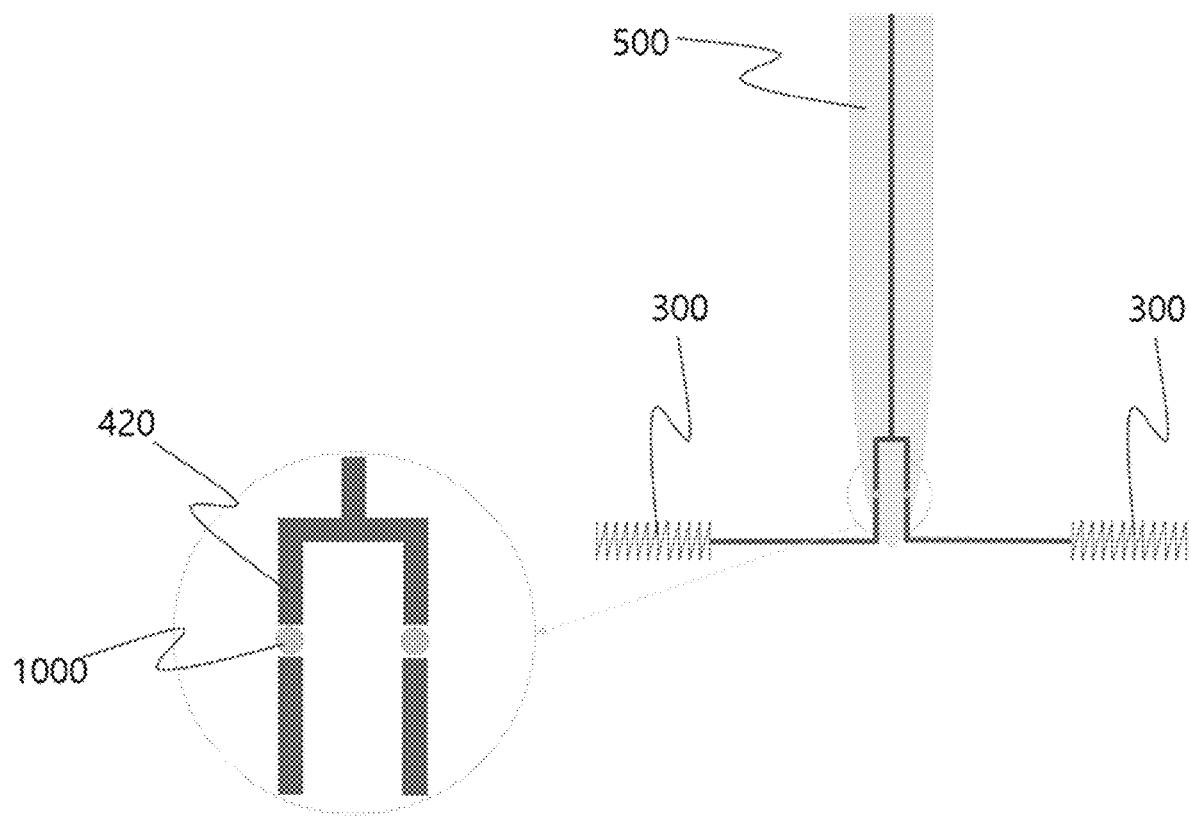

FIGS. 37 to 39 are views for explaining insulation members.

Referring to FIG. 37, in the device for reducing pollutants in indoor air, ambient air, or exhaust gas by using nonthermal plasma according to the present embodiment, the vertical rod 410 is divided into two or more vertical rods 410, and an insulation member 1000 is inserted between the separated vertical rods 410.

Referring to FIG. 38, like the configuration illustrated in FIG. 37, the horizontal rod 420 is divided into two or more horizontal rods 420, and the insulation member 1000 is inserted between the separated horizontal rods 420.

Referring to FIG. 39, the two vertical rods 410 branch off from the vertical rod 410 before the vertical rod 410 is connected to the horizontal rod 420, and the insulation members 1000 may be respectively inserted into the two branch vertical rods. In this case, the horizontal rods 420 are respectively connected to the two branch vertical rods.

When the voltage, which is applied to the separated vertical rods 410 or the separated horizontal rods 420, is higher in magnitude than preset limit voltage, the insulation member 1000 allows the electric current to flow through the insulation member 1000. When the voltage, which is applied to the separated vertical rods 410 or the separated horizontal rods 420, is higher in magnitude than the limit voltage, the insulation member 1000 blocks the electric current.

Therefore, when the voltage, which is applied to the separated vertical rods 410 or the separated horizontal rods 420 by the occurrence of arcing, becomes equal to or lower than the limit voltage, the flow of the electric current may be blocked, thereby removing arcing occurring in the emitter.

More specifically, the insulation member 1000, which is disposed between the separated vertical rods 410 or the separated horizontal rods 420, automatically blocks power when the voltage is lowered as the arcing occurs in the emitter, such that arcing is eliminated. Because there is no arcing, normal voltage is instantaneously recovered, such that electric current flows through the insulating material.

The insulation member 1000 may be made of an insulating material and configured as a spherical body, an elliptical body, or a polyhedral body having a size equal to or smaller than a diameter of the horizontal rod and a diameter of the vertical rod. The separated horizontal rods 420 and the separated vertical rods 410 may be disposed to be in close contact with the insulation members 1000.

What is claimed is:

1. A device for reducing pollutants in indoor air, ambient air, or exhaust gas by using nonthermal plasma, the device comprising:
   a chamber configured as a tubular body in which processing target gas configured as indoor air, ambient air, or exhaust gas including pollutants flows, the chamber being connected to a ground power source;
   a power supply device disposed outside the chamber and configured to continuously apply voltage having a magnitude set as direct current or alternating current;
   an emitter configured as a hollow tubular body having a plurality of cusps formed on an outer surface thereof and configured to generate plasma, the emitter being disposed in the chamber, elongated in a direction parallel to a flow direction of the processing target gas, electrically connected to the power supply device, and configured to generate nonthermal plasma;
   a rod configured to electrically connect the emitter and the power supply device and support the emitter so that the emitter is disposed at a center of an interior of the chamber; and
   an insulator configured to electrically insulate the rod and the chamber and prevent arcing from occurring between the rod and the chamber, and
   wherein the rod includes:
   a vertical rod extending from one side of an inner surface of the chamber to a center of the chamber; and
   a horizontal rod extending along the center of the chamber and having a distal end to which the emitter is coupled,
   wherein the insulator surrounds an entire portion of the vertical rod from one side of the inner surface of the chamber to an end of the vertical rod, and
   wherein the device includes at least any one of:
   an insulator lower-end outer sheath made of a metal conductor containing stainless steel and copper and configured to surround an outer surface of the insulator by a length equal to or shorter than a preset height H that is equal to or smaller than ½ of a vertical height h of the emitter from a position of the horizontal rod; and
   an insulator upper-end outer sheath made of a metal conductor containing stainless steel and copper and configured to surround the outer surface of the insulator by a length equal to or shorter than the preset height H from the one side of the inner surface of the chamber.

2. The device of claim 1, wherein a ratio between a surface area of the emitter and an area of the chamber inner surface corresponding to a length of the emitter is 1:1.

3. The device of claim 1, wherein a surface of the emitter is coated with a carbon nanotube.

4. The device of claim 1, wherein each of the cusps provided on the emitter has at least one shape selected from:
   a first cusp shape having at least one shape selected from a conical shape, a hemispherical shape, an elliptical hemispherical shape, a cylindrical shape, a pyramidal shape, a truncated pyramidal shape, and a prismatic shape;
   a second cusp shape having a shape having a curved surface in which a part or an entirety of a lateral surface of the first cusp shape includes a circular or elliptical shape; and
   a third cusp shape having a shape in which screw threads, screw troughs, or serrated teeth are spirally formed from an upper end to a lower end of or a part of a lateral surface of each of the first and second cusps.

5. The device of claim 1, comprising:
   a support configured to connect the emitter and the rod; and
   covers provided at two opposite ends of the emitter based on a longitudinal direction of the emitter and configured to isolate an interior of the emitter.

6. The device of claim 1, wherein the insulator is provided as a plurality of insulators, wherein an upstream insulator, among the plurality of insulators, is disposed as a dummy insulator to which no voltage is applied, and wherein the processing target gas is prevented from being in direct contact with a downstream insulator, such that a source of pollution and moisture vapor contained in the processing target gas are prevented from being accumulated on a surface of the downstream insulator.

7. The device of claim 1, wherein the rod includes:
a vertical rod extending from one side of an inner surface of the chamber to a center of the chamber; and
a horizontal rod extending along the center of the chamber and having a distal end to which the emitter is coupled,
wherein the insulator surrounds the vertical rod from one side of the inner surface of the chamber, and
wherein the insulator has a length such that the vertical rod is exposed from the horizontal rod by a preset height H equal to or smaller than ½ of a vertical height h of the emitter.

8. The device of claim 1, wherein the chamber includes an arcing prevention chamber that is a space formed convexly outward from one side of an inner surface of the chamber,
wherein the rod includes:
a vertical rod extending from one side of an inner surface of the arcing prevention chamber to a center of the chamber; and
a horizontal rod extending along the center of the chamber and having a distal end to which the emitter is coupled, and
wherein a shortest distance between the horizontal rod and the inner surface of the arcing prevention chamber is equal to or larger than a radius of the chamber, such that the arcing prevention chamber prevents arcing between the arcing prevention chamber and the horizontal rod.

9. The device of claim 8, wherein the chamber has a preset length b from the inner surface to a center point thereof,
wherein a length a of the insulator is a length equal to or longer than the preset length b, and
wherein a horizontal length c to the vertical rod from an edge at which the arcing prevention chamber and the chamber meet is a length equal to or shorter than a preset length of the horizontal rod.

10. The device of claim 8, wherein a cross-section of the arcing prevention chamber based on the flow direction of the processing target gas has a shape selected from shapes that partially define circular, elliptical, and polygonal shapes.

11. The device of claim 8, wherein the arcing prevention chamber is installed in an annular shape along a periphery of the chamber in a part or an entirety of the periphery of the chamber.

12. The device of claim 1, wherein in case that only one of the insulator upper-end outer sheath and the insulator lower-end outer sheath is included, a length of one of the insulator upper-end outer sheath and the insulator lower-end outer sheath is equal to or smaller than ½ of a vertical height h of the emitter, and
wherein in case that both the insulator upper-end outer sheath and the insulator lower-end outer sheath are included, a sum of a length of the insulator upper-end outer sheath and a length of the insulator lower-end outer sheath is equal to or smaller than ½ of the vertical height h of the emitter.

13. The device of claim 1, wherein the power supply device supplies direct current with reversed polarity at a preset time period to detach a source of pollution contained in the processing target gas and adsorbed in the chamber.

14. The device of claim 1, comprising:
a bundle of unit chambers disposed in a flow path of the processing target gas of the chamber and configured to divide an entire vertical cross-section into a plurality of cross-sections in the flow direction of the processing target gas,
wherein a plurality of unit chambers, which constitutes the bundle of unit chambers, has cross-sections having the same shape,
wherein the emitter is disposed at a center of an interior of each of the plurality of unit chambers,
wherein an outer surface of the emitter is similar in shape to an inner surface of the unit chamber, and
wherein the emitter is always positioned at a predetermined position within a shortest distance from any position on the outer surface of the emitter to the inner surface of the unit chamber.

15. The device of claim 1, wherein the vertical or horizontal rod is divided into two or more separated vertical or horizontal rods in a longitudinal direction,
wherein the device further includes an insulation member disposed to be inserted into the separated vertical or horizontal rods so that the separated vertical or horizontal rods is connected in the longitudinal direction,
wherein the insulation member allows electric current to smoothly flow between the separated vertical or horizontal rods when voltage higher than preset limit voltage is applied between the separated vertical or horizontal rods, and
wherein the insulation member blocks a flow of electric current between the separated vertical or horizontal rods when voltage equal to or lower than the preset limit voltage is applied between the separated vertical or horizontal rods.

* * * * *